US010785037B2

(12) United States Patent
Richardson et al.

(10) Patent No.: US 10,785,037 B2
(45) Date of Patent: Sep. 22, 2020

(54) MANAGING SECURE CONTENT IN A CONTENT DELIVERY NETWORK

(71) Applicant: Amazon Technologies, Inc., Seattle, WA (US)

(72) Inventors: David R. Richardson, Seattle, WA (US); Mustafa I. Abrar, Seattle, WA (US); Don Johnson, Seattle, WA (US); John Cormie, Seattle, WA (US); Bradley Eugene Marshall, Seattle, WA (US); Mark Joseph Cavage, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/195,628

(22) Filed: Nov. 19, 2018

(65) Prior Publication Data

US 2019/0089542 A1 Mar. 21, 2019

Related U.S. Application Data

(63) Continuation of application No. 15/597,841, filed on May 17, 2017, now Pat. No. 10,135,620, which is a (Continued)

(51) Int. Cl.
*H04L 9/32* (2006.01)
*H04L 29/06* (2006.01)

(52) U.S. Cl.
CPC .......... *H04L 9/3247* (2013.01); *H04L 63/101* (2013.01); *H04L 63/126* (2013.01); *H04L 63/20* (2013.01)

(58) Field of Classification Search
CPC .................................................... H04L 9/3247
See application file for complete search history.

(56) References Cited

U.S. PATENT DOCUMENTS

| | | | |
|---|---|---|---|
| 5,063,500 | A | 11/1991 | Shorter |
| 5,341,477 | A | 8/1994 | Pitkin et al. |

(Continued)

FOREIGN PATENT DOCUMENTS

| | | | |
|---|---|---|---|
| CA | 2741 895 | A1 | 5/2010 |
| CA | 2765397 | A1 | 2/2011 |

(Continued)

OTHER PUBLICATIONS

American Bar Association; Digital Signature Guidelines Tutorial; Feb. 10, 2002 [retrived on Mar. 2, 2010]; American Bar Association Section of Science and Technology Information Security Committee; Retrived from the internet: (continued on next line) (Year: 2002).*

(Continued)

*Primary Examiner* — Bradley W Holder
(74) *Attorney, Agent, or Firm* — Knobbe, Martens, Olson & Bear, LLP

(57) ABSTRACT

A system, method, and computer readable medium for managing secure content by CDN service providers are provided. A network storage provider stores one or more resources on behalf of a content provider. A CDN service provider obtains client computing device requests for secure content. Based on processing first signature information, the CDN service provider determines whether the secure content is available to the client computing device. If the CDN service provider does not maintain the requested content, the CDN service provider transmits a request to the network storage provider. Based on second signature information and an identifier associated with the CDN service provider, the network storage provider processes the request based policy information associated with the identifier.

20 Claims, 7 Drawing Sheets

Related U.S. Application Data continuation of application No. 14/800,591, filed on Jul. 15, 2015, now Pat. No. 9,712,325, which is a continuation of application No. 13/794,415, filed on Mar. 11, 2013, now Pat. No. 9,130,756, which is a continuation of application No. 12/722,454, filed on Mar. 11, 2010, now Pat. No. 8,397,073.

(60) Provisional application No. 61/240,164, filed on Sep. 4, 2009.

(56) References Cited

U.S. PATENT DOCUMENTS 5,459,837 A 10/1995 Caccavale
5,611,049 A 3/1997 Pitts
5,627,889 A 5/1997 Eslambolchi
5,701,467 A 12/1997 Freeston
5,764,910 A 6/1998 Shachar
5,774,660 A 6/1998 Brendel et al.
5,852,717 A 12/1998 Bhide et al.
5,892,914 A 4/1999 Pitts
5,893,116 A 4/1999 Simmonds et al.
5,895,462 A 4/1999 Toki
5,905,248 A 5/1999 Russell et al.
5,933,811 A 8/1999 Angles et al.
5,937,427 A 8/1999 Shinagawa et al.
5,974,454 A 10/1999 Apfel et al.
5,991,306 A 11/1999 Burns et al.
5,999,274 A 12/1999 Lee et al.
6,006,264 A 12/1999 Colby et al.
6,016,512 A 1/2000 Huitema
6,018,619 A 1/2000 Allard et al.
6,026,452 A 2/2000 Pitts
6,038,601 A 3/2000 Lambert et al.
6,052,718 A * 4/2000 Gifford ............ H04L 29/12009 709/219
6,078,960 A 6/2000 Ballard
6,085,234 A 7/2000 Pitts et al.
6,092,100 A 7/2000 Berstis et al.
6,098,096 A 8/2000 Tsirigotis et al.
6,108,703 A 8/2000 Leighton et al.
6,128,279 A 10/2000 O'Neil et al.
6,151,631 A 11/2000 Ansell et al.
6,157,942 A 12/2000 Chu et al.
6,167,438 A 12/2000 Yates et al.
6,167,446 A 12/2000 Lister et al.
6,173,316 B1 1/2001 De Boor et al.
6,182,111 B1 1/2001 Inohara et al.
6,182,125 B1 1/2001 Borella et al.
6,185,598 B1 2/2001 Farber et al.
6,192,051 B1 2/2001 Lipman et al.
6,205,475 B1 3/2001 Pitts
6,223,209 B1 4/2001 Watson et al.
6,223,288 B1 4/2001 Byrne
6,243,761 B1 6/2001 Mogul et al.
6,275,496 B1 8/2001 Burns et al.
6,286,043 B1 9/2001 Cuomo et al.
6,286,084 B1 9/2001 Wexler et al.
6,304,913 B1 * 10/2001 Rune ................ H04L 29/12066 709/241
6,324,580 B1 11/2001 Jindal et al.
6,330,602 B1 12/2001 Law et al.
6,338,082 B1 1/2002 Schneider
6,345,308 B1 2/2002 Abe
6,351,743 B1 2/2002 DeArdo et al.
6,351,775 B1 2/2002 Yu
6,363,411 B1 3/2002 Dugan et al.
6,366,952 B2 4/2002 Pitts
6,374,290 B1 4/2002 Scharber et al.
6,377,257 B1 4/2002 Borrel et al.
6,386,043 B1 5/2002 Millins
6,389,532 B1 5/2002 Gupta et al.
6,405,252 B1 6/2002 Gupta et al.
6,408,360 B1 6/2002 Chamberlain et al.
6,411,967 B1 6/2002 Van Renesse
6,415,280 B1 7/2002 Farber et al.
6,430,607 B1 8/2002 Kavner
6,438,592 B1 8/2002 Killian
6,442,165 B1 8/2002 Sitaraman et al.
6,452,925 B1 9/2002 Sistanizadeh et al.
6,457,047 B1 9/2002 Chandra et al.
6,459,909 B1 10/2002 Bilcliff et al.
6,473,804 B1 10/2002 Kaiser et al.
6,484,143 B1 11/2002 Swildens et al.
6,484,161 B1 11/2002 Chipalkatti et al.
6,493,765 B1 12/2002 Cunningham et al.
6,505,241 B2 * 1/2003 Pitts ................... G06F 12/0813 709/203
6,513,112 B1 1/2003 Craig et al.
6,523,036 B1 2/2003 Hickman et al.
6,529,910 B1 3/2003 Fleskes
6,529,953 B1 3/2003 Van Renesse
6,553,413 B1 * 4/2003 Leighton ............ H04L 61/1511 709/219
6,560,610 B1 5/2003 Eatherton et al.
6,611,873 B1 8/2003 Kanehara
6,622,168 B1 9/2003 Datta
6,643,357 B2 11/2003 Lumsden
6,643,707 B1 11/2003 Booth
6,654,807 B2 * 11/2003 Farber .................... G06F 9/505 709/225
6,658,462 B1 12/2003 Dutta
6,665,706 B2 12/2003 Kenner et al.
6,678,717 B1 1/2004 Schneider
6,678,791 B1 1/2004 Jacobs et al.
6,681,282 B1 1/2004 Golden et al.
6,687,846 B1 2/2004 Adrangi et al.
6,694,358 B1 2/2004 Swildens et al.
6,697,805 B1 2/2004 Choquier et al.
6,718,324 B2 4/2004 Edlund et al.
6,724,770 B1 4/2004 Van Renesse
6,732,237 B1 5/2004 Jacobs et al.
6,754,699 B2 * 6/2004 Swildens ............... G06F 9/505 370/229
6,754,706 B1 6/2004 Swildens et al.
6,760,721 B1 7/2004 Chasen et al.
6,769,031 B1 7/2004 Bero
6,782,398 B1 8/2004 Bahl
6,785,704 B1 8/2004 McCanne
6,795,434 B1 9/2004 Kumar et al.
6,799,214 B1 9/2004 Li
6,804,706 B2 10/2004 Pitts
6,810,291 B2 10/2004 Card et al.
6,810,411 B1 10/2004 Coughlin et al.
6,829,654 B1 12/2004 Jungck
6,862,607 B1 3/2005 Vermeulen
6,868,439 B2 3/2005 Basu et al.
6,874,017 B1 * 3/2005 Inoue ................... H04L 12/189 709/217
6,917,951 B2 7/2005 Orbits et al.
6,925,499 B1 8/2005 Chen et al.
6,928,467 B2 8/2005 Peng et al.
6,928,485 B1 8/2005 Krishnamurthy et al.
6,941,562 B2 9/2005 Gao et al.
6,950,848 B1 9/2005 Yousefi'zadeh et al.
6,961,783 B1 11/2005 Cook et al.
6,963,850 B1 11/2005 Bezos et al.
6,968,389 B1 11/2005 Menditto et al.
6,976,090 B2 12/2005 Ben-Shaul et al.
6,981,017 B1 12/2005 Kasriel et al.
6,985,945 B2 1/2006 Farhat et al.
6,986,018 B2 1/2006 O'Rourke et al.
6,990,526 B1 1/2006 Zhu
6,996,616 B1 2/2006 Leighton et al.
7,003,555 B1 2/2006 Jungck
7,006,099 B2 2/2006 Gut et al.
7,007,089 B2 2/2006 Freedman
7,010,578 B1 3/2006 Lewin et al.
7,010,598 B2 3/2006 Sitaraman et al.
7,024,466 B2 4/2006 Outten et al.
7,027,582 B2 4/2006 Khello et al.
7,031,445 B2 4/2006 Lumsden
7,032,010 B1 4/2006 Swildens et al.

(56) References Cited

U.S. PATENT DOCUMENTS 7,058,633 B1 6/2006 Gnagy et al.
7,058,706 B1 6/2006 Iyer et al.
7,058,953 B2 6/2006 Willard et al.
7,062,158 B1 6/2006 Ayaki
7,065,587 B2 6/2006 Huitema et al.
7,072,982 B2 7/2006 Teodosiu et al.
7,076,633 B2 7/2006 Tormasov et al.
7,082,476 B1 7/2006 Cohen et al.
7,086,061 B1 8/2006 Joshi et al.
7,092,505 B2 8/2006 Allison et al.
7,092,997 B1 8/2006 Kasriel et al.
7,096,266 B2 8/2006 Lewin et al.
7,099,936 B2 8/2006 Chase et al.
7,103,645 B2 9/2006 Leighton et al.
7,114,160 B2 9/2006 Suryanarayana et al.
7,117,262 B2 10/2006 Bai et al.
7,133,905 B2 * 11/2006 Dilley .................... H04L 29/06 709/219
7,136,922 B2 11/2006 Sundaram et al.
7,139,808 B2 11/2006 Anderson et al.
7,139,821 B1 11/2006 Shah et al.
7,143,169 B1 11/2006 Champagne et al.
7,143,170 B2 11/2006 Swildens et al.
7,146,560 B2 12/2006 Dang et al.
7,149,809 B2 12/2006 Barde et al.
7,152,118 B2 12/2006 Anderson, IV et al.
7,162,539 B2 1/2007 Garcie-Luna-Aceves
7,165,117 B1 1/2007 Sitaraman et al.
7,174,382 B2 2/2007 Ramanathan et al.
7,185,046 B2 2/2007 Ferstl et al.
7,185,063 B1 2/2007 Kasriel et al.
7,185,084 B2 2/2007 Sirivara et al.
7,188,214 B1 3/2007 Kasriel et al.
7,194,522 B1 * 3/2007 Swildens ................ G06F 9/505 370/229
7,194,552 B1 3/2007 Schneider
7,200,667 B2 4/2007 Teodosiu et al.
7,200,673 B1 4/2007 Augart
7,216,170 B2 5/2007 Ludvig et al.
7,225,254 B1 5/2007 Swildens et al.
7,228,350 B2 6/2007 Hong et al.
7,228,359 B1 6/2007 Monteiro
7,233,978 B2 6/2007 Overton et al.
7,240,100 B1 * 7/2007 Wein ...................... H04L 63/08 709/214
7,249,196 B1 7/2007 Peiffer et al.
7,251,675 B1 7/2007 Kamakura et al.
7,254,626 B1 8/2007 Kommula et al.
7,254,636 B1 8/2007 O'Toole, Jr. et al.
7,257,581 B1 8/2007 Steele et al.
7,260,598 B1 8/2007 Liskov et al.
7,260,639 B2 8/2007 Afergan et al.
7,269,784 B1 9/2007 Kasriel et al.
7,272,227 B1 9/2007 Beran
7,274,658 B2 9/2007 Bornstein et al.
7,284,056 B2 10/2007 Ramig
7,289,519 B1 10/2007 Liskov
7,293,093 B2 11/2007 Leighton
7,308,499 B2 12/2007 Chavez
7,310,686 B2 12/2007 Uysal
7,316,648 B2 1/2008 Kelly et al.
7,318,074 B2 1/2008 Iyengar et al.
7,320,131 B1 1/2008 O'Toole, Jr.
7,321,918 B2 1/2008 Burd et al.
7,337,968 B2 3/2008 Wilz, Sr. et al.
7,339,937 B2 3/2008 Mitra et al.
7,340,505 B2 3/2008 Lisiecki et al.
7,343,397 B2 3/2008 Kochanski
7,350,075 B1 3/2008 Eastham et al.
7,362,703 B1 4/2008 Taft et al.
7,363,291 B1 4/2008 Page
7,363,626 B2 4/2008 Koutharapu et al.
7,370,089 B2 5/2008 Boyd et al.
7,372,809 B2 5/2008 Chen
7,373,416 B2 5/2008 Kagan et al.
7,376,716 B2 5/2008 Dilley et al.
7,376,736 B2 5/2008 Sundaram et al.
7,380,078 B2 5/2008 Ikegaya et al.
7,389,354 B1 6/2008 Sitaraman et al.
7,392,236 B2 6/2008 Rusch et al.
7,398,301 B2 7/2008 Hennessey et al.
7,406,512 B2 7/2008 Swildens et al.
7,406,522 B2 7/2008 Riddle
7,409,712 B1 8/2008 Brooks et al.
7,430,610 B2 9/2008 Pace et al.
7,441,045 B2 10/2008 Skene et al.
7,441,261 B2 10/2008 Slater et al.
7,451,230 B2 11/2008 Corrado et al.
7,454,457 B1 11/2008 Lowery et al.
7,454,500 B1 11/2008 Hsu et al.
7,461,170 B1 12/2008 Taylor et al.
7,464,142 B2 12/2008 Flurry et al.
7,478,148 B2 1/2009 Neerdaels
7,492,720 B2 2/2009 Pruthi et al.
7,496,651 B1 2/2009 Joshi
7,499,998 B2 3/2009 Toebes et al.
7,502,836 B1 3/2009 Menditto et al.
7,505,464 B2 3/2009 Okmianski et al.
7,506,034 B2 3/2009 Coates et al.
7,519,705 B1 4/2009 Papagiannaki et al.
7,519,720 B2 4/2009 Fishman et al.
7,519,726 B2 4/2009 Palliyil et al.
7,523,181 B2 4/2009 Swildens et al.
7,543,024 B2 6/2009 Holstege
7,548,947 B2 6/2009 Kasriel et al.
7,552,235 B2 6/2009 Chase et al.
7,555,542 B1 6/2009 Ayers et al.
7,561,571 B1 7/2009 Lovett et al.
7,565,407 B1 7/2009 Hayball
7,568,032 B2 7/2009 Feng et al.
7,573,916 B1 8/2009 Bechtolsheim et al.
7,574,499 B1 8/2009 Swildens et al.
7,581,009 B1 8/2009 Hsu et al.
7,593,935 B2 9/2009 Sullivan
7,594,189 B1 9/2009 Walker et al.
7,596,619 B2 9/2009 Leighton et al.
7,603,439 B2 10/2009 Dilley et al.
7,613,815 B1 11/2009 Prakash et al.
7,617,222 B2 11/2009 Coulthard et al.
7,623,460 B2 11/2009 Miyazaki
7,624,169 B2 11/2009 Lisiecki et al.
7,624,264 B2 11/2009 Aura et al.
7,631,101 B2 12/2009 Sullivan et al.
7,640,296 B2 12/2009 Fuchs et al.
7,650,376 B1 1/2010 Blumenau
7,653,700 B1 1/2010 Bahl et al.
7,653,725 B2 1/2010 Yahiro et al.
7,657,613 B1 2/2010 Hanson et al.
7,657,622 B1 2/2010 Douglis et al.
7,661,027 B2 2/2010 Langen et al.
7,664,831 B2 2/2010 Cartmell et al.
7,664,879 B2 2/2010 Chan et al.
7,676,570 B2 3/2010 Levy et al.
7,680,897 B1 3/2010 Carter et al.
7,684,394 B1 3/2010 Cutbill et al.
7,685,109 B1 3/2010 Ransil et al.
7,685,251 B2 3/2010 Houlihan et al.
7,693,813 B1 4/2010 Cao et al.
7,693,959 B2 4/2010 Leighton et al.
7,702,724 B1 4/2010 Brydon et al.
7,706,740 B2 4/2010 Collins et al.
7,707,314 B2 4/2010 McCarthy et al.
7,711,647 B2 5/2010 Gunaseelan et al.
7,711,788 B2 5/2010 Lev Ran et al.
7,716,367 B1 5/2010 Leighton et al.
7,725,602 B2 5/2010 Liu et al.
7,730,187 B2 6/2010 Raciborski et al.
7,739,400 B2 6/2010 Lindbo et al.
7,747,720 B2 6/2010 Toebes et al.
7,756,017 B2 7/2010 Goyal et al.
7,756,913 B1 7/2010 Day
7,756,965 B2 7/2010 Joshi
7,757,202 B2 7/2010 Dahlsted et al.
7,761,572 B1 7/2010 Auerbach

(56) References Cited

U.S. PATENT DOCUMENTS

| | | | |
|---|---|---|---|
| 7,765,304 | B2 | 7/2010 | Davis et al. |
| 7,769,823 | B2 | 8/2010 | Jenny et al. |
| 7,773,596 | B1 | 8/2010 | Marques |
| 7,774,342 | B1 | 8/2010 | Virdy |
| 7,783,727 | B1 | 8/2010 | Foley et al. |
| 7,787,380 | B1 | 8/2010 | Aggarwal et al. |
| 7,792,989 | B2 | 9/2010 | Toebes et al. |
| 7,805,516 | B2 | 9/2010 | Kettler et al. |
| 7,809,597 | B2 | 10/2010 | Das et al. |
| 7,813,308 | B2 | 10/2010 | Reddy et al. |
| 7,814,229 | B1 | 10/2010 | Cabrera et al. |
| 7,818,454 | B2 | 10/2010 | Kim et al. |
| 7,827,256 | B2 | 11/2010 | Phillips et al. |
| 7,836,177 | B2 | 11/2010 | Kasriel et al. |
| 7,853,719 | B1 | 12/2010 | Cao et al. |
| 7,865,594 | B1 | 1/2011 | Baumback et al. |
| 7,865,953 | B1 | 1/2011 | Hsieh et al. |
| 7,873,065 | B1 | 1/2011 | Mukerji et al. |
| 7,890,612 | B2 | 2/2011 | Todd et al. |
| 7,890,989 | B1 | 2/2011 | Hofrichter et al. |
| 7,899,899 | B2 | 3/2011 | Joshi |
| 7,904,875 | B2 | 3/2011 | Hegyi |
| 7,912,921 | B2 | 3/2011 | O'Rourke et al. |
| 7,925,713 | B1 | 4/2011 | Day et al. |
| 7,925,782 | B2 | 4/2011 | Sivasubramanian et al. |
| 7,930,393 | B1 | 4/2011 | Baumback et al. |
| 7,930,402 | B2 | 4/2011 | Swildens et al. |
| 7,930,427 | B2 | 4/2011 | Josefsberg et al. |
| 7,933,988 | B2 | 4/2011 | Nasuto et al. |
| 7,937,477 | B1 | 5/2011 | Day et al. |
| 7,945,693 | B2 | 5/2011 | Farber et al. |
| 7,949,779 | B2 | 5/2011 | Farber et al. |
| 7,958,222 | B1 | 6/2011 | Pruitt et al. |
| 7,958,258 | B2 | 6/2011 | Yeung et al. |
| 7,962,597 | B2 | 6/2011 | Richardson et al. |
| 7,966,404 | B2 | 6/2011 | Hedin et al. |
| 7,970,816 | B2 | 6/2011 | Chess et al. |
| 7,970,940 | B1 | 6/2011 | van de Ven et al. |
| 7,979,509 | B1 | 7/2011 | Malmskog et al. |
| 7,991,910 | B2 | 8/2011 | Richardson et al. |
| 7,996,533 | B2 | 8/2011 | Leighton et al. |
| 7,996,535 | B2 | 8/2011 | Auerbach |
| 8,000,724 | B1 | 8/2011 | Rayburn et al. |
| 8,001,187 | B2 | 8/2011 | Stochosky |
| 8,010,707 | B2 | 8/2011 | Elzur et al. |
| 8,019,869 | B2 | 9/2011 | Kriegsman |
| 8,024,441 | B2 | 9/2011 | Kommula et al. |
| 8,028,090 | B2 | 9/2011 | Richardson et al. |
| 8,041,773 | B2 | 10/2011 | Abu-Ghazaleh et al. |
| 8,041,809 | B2 | 10/2011 | Sundaram et al. |
| 8,041,818 | B2 | 10/2011 | Gupta et al. |
| 8,042,054 | B2 | 10/2011 | White et al. |
| 8,065,275 | B2 | 11/2011 | Eriksen et al. |
| 8,069,231 | B2 | 11/2011 | Schran et al. |
| 8,073,940 | B1 | 12/2011 | Richardson et al. |
| 8,082,348 | B1 | 12/2011 | Averbuj et al. |
| 8,108,623 | B2 | 1/2012 | Krishnaprasad et al. |
| 8,117,306 | B1 | 2/2012 | Baumback et al. |
| 8,122,098 | B1 | 2/2012 | Richardson et al. |
| 8,122,124 | B1 | 2/2012 | Baumback et al. |
| 8,132,242 | B1 | 3/2012 | Wu |
| 8,135,820 | B2 | 3/2012 | Richardson et al. |
| 8,155,126 | B1 | 4/2012 | Mao et al. |
| 8,156,199 | B1 | 4/2012 | Hoche-Mong et al. |
| 8,156,243 | B2 | 4/2012 | Richardson et al. |
| 8,161,184 | B2 | 4/2012 | Sekar et al. |
| 8,175,863 | B1 | 5/2012 | Ostermeyer et al. |
| 8,180,720 | B1 | 5/2012 | Kovacs et al. |
| 8,190,682 | B2 | 5/2012 | Paterson-Jones et al. |
| 8,195,605 | B2 | 6/2012 | Chellappa et al. |
| 8,195,837 | B2 | 6/2012 | McCarthy et al. |
| 8,209,695 | B1 | 6/2012 | Pruyne et al. |
| 8,224,971 | B1 | 7/2012 | Miller et al. |
| 8,224,986 | B1 | 7/2012 | Liskov et al. |
| 8,224,994 | B1 | 7/2012 | Schneider |
| 8,234,403 | B2 | 7/2012 | Richardson et al. |
| 8,239,530 | B2 | 8/2012 | Sundaram et al. |
| 8,250,135 | B2 | 8/2012 | Driesen et al. |
| 8,250,211 | B2 | 8/2012 | Swildens et al. |
| 8,250,219 | B2 | 8/2012 | Raciborski et al. |
| 8,260,914 | B1 | 8/2012 | Ranjan |
| 8,261,062 | B2 | 9/2012 | Aura et al. |
| 8,266,288 | B2 | 9/2012 | Banerjee et al. |
| 8,266,327 | B2 | 9/2012 | Kumar et al. |
| 8,271,471 | B1 | 9/2012 | Kamvar et al. |
| 8,280,998 | B2 | 10/2012 | Joshi |
| 8,281,035 | B2 | 10/2012 | Farber et al. |
| 8,291,046 | B2 | 10/2012 | Farber et al. |
| 8,291,117 | B1 | 10/2012 | Eggleston et al. |
| 8,296,393 | B2 | 10/2012 | Alexander et al. |
| 8,296,786 | B2 | 10/2012 | Faust et al. |
| 8,301,600 | B1 | 10/2012 | Helmick et al. |
| 8,301,645 | B1 | 10/2012 | Crook |
| 8,321,568 | B2 | 11/2012 | Sivasubramanian et al. |
| 8,321,588 | B2 | 11/2012 | Richardson et al. |
| 8,356,074 | B1 | 1/2013 | Ehrlich et al. |
| 8,380,831 | B2 | 2/2013 | Barber |
| 8,380,851 | B2 | 2/2013 | McCarthy et al. |
| 8,392,928 | B1 | 3/2013 | Forys et al. |
| 8,396,908 | B2 | 3/2013 | Moore et al. |
| 8,402,137 | B2 | 3/2013 | Sivasuramanian et al. |
| 8,423,408 | B1 | 4/2013 | Barnes et al. |
| 8,423,662 | B1 | 4/2013 | Weihl et al. |
| 8,433,749 | B2 | 4/2013 | Wee et al. |
| 8,443,167 | B1 | 5/2013 | Fallone et al. |
| 8,447,831 | B1 | 5/2013 | Sivasubramanian et al. |
| 8,447,876 | B2 | 5/2013 | Verma et al. |
| 8,452,745 | B2 | 5/2013 | Ramakrishna |
| 8,452,874 | B2 | 5/2013 | MacCarthaigh et al. |
| 8,463,877 | B1 | 6/2013 | Richardson |
| 8,468,222 | B2 | 6/2013 | Sakata et al. |
| 8,468,245 | B2 | 6/2013 | Farber et al. |
| 8,473,613 | B2 | 6/2013 | Farber et al. |
| 8,478,883 | B2 | 7/2013 | Day et al. |
| 8,478,903 | B2 | 7/2013 | Farber et al. |
| 8,504,721 | B2 | 8/2013 | Hsu et al. |
| 8,510,428 | B2 | 8/2013 | Joshi |
| 8,510,807 | B1 | 8/2013 | Elazary et al. |
| 8,516,082 | B2 | 8/2013 | Cadwell et al. |
| 8,521,851 | B1 | 8/2013 | Richardson et al. |
| 8,521,876 | B2 | 8/2013 | Goodman et al. |
| 8,521,880 | B1 | 8/2013 | Richardson et al. |
| 8,521,885 | B1 | 8/2013 | Richardson et al. |
| 8,521,908 | B2 | 8/2013 | Holmes et al. |
| 8,526,405 | B2 | 9/2013 | Curtis et al. |
| 8,527,639 | B1 | 9/2013 | Liskov et al. |
| 8,527,645 | B1 | 9/2013 | Proffit et al. |
| 8,527,658 | B2 | 9/2013 | Holmes et al. |
| 8,549,646 | B2 | 10/2013 | Stavrou et al. |
| 8,572,208 | B2 | 10/2013 | Farber et al. |
| 8,572,210 | B2 | 10/2013 | Farber et al. |
| 8,577,992 | B1 | 11/2013 | Richardson et al. |
| 8,589,996 | B2 | 11/2013 | Ma et al. |
| 8,606,996 | B2 | 12/2013 | Richardson et al. |
| 8,612,565 | B2 | 12/2013 | Schneider |
| 8,615,549 | B2 | 12/2013 | Knowles et al. |
| 8,619,780 | B1 | 12/2013 | Brandwine |
| 8,626,950 | B1 | 1/2014 | Richardson et al. |
| 8,635,340 | B1 | 1/2014 | Schneider |
| 8,639,817 | B2 | 1/2014 | Sivasubramanian et al. |
| 8,645,539 | B2 | 2/2014 | McCarthy et al. |
| 8,645,700 | B2 | 2/2014 | Smith et al. |
| 8,676,918 | B2 | 3/2014 | Richardson et al. |
| 8,683,023 | B1 | 3/2014 | Brandwine et al. |
| 8,683,076 | B2 | 3/2014 | Farber et al. |
| 8,688,837 | B1 | 4/2014 | Richardson et al. |
| 8,712,950 | B2 | 4/2014 | Smith et al. |
| 8,732,309 | B1 | 5/2014 | Richardson et al. |
| 8,745,177 | B1 | 6/2014 | Kazerani et al. |
| 8,756,322 | B1 | 6/2014 | Lynch |
| 8,756,325 | B2 | 6/2014 | Sivasubramanian et al. |
| 8,756,341 | B1 | 6/2014 | Richardson et al. |
| 8,775,553 | B2 | 7/2014 | Cansino et al. |
| 8,782,207 | B2 | 7/2014 | Qiu et al. |

(56) References Cited

U.S. PATENT DOCUMENTS

| | | | |
|---|---|---|---|
| 8,782,236 B1 | 7/2014 | Marshall et al. | |
| 8,782,279 B2 | 7/2014 | Eggleston et al. | |
| 8,788,671 B2 | 7/2014 | Richardson et al. | |
| 8,812,727 B1 | 8/2014 | Sorenson, III et al. | |
| 8,819,283 B2 | 8/2014 | Richardson et al. | |
| 8,826,032 B1 | 9/2014 | Yahalom et al. | |
| 8,903,788 B2 * | 12/2014 | Wolff .................... | G06F 16/176 707/698 |
| 8,904,009 B1 | 12/2014 | Marshall et al. | |
| 8,914,514 B1 | 12/2014 | Jenkins et al. | |
| 8,914,626 B1 | 12/2014 | Adogla et al. | |
| 8,914,797 B2 | 12/2014 | Osogami et al. | |
| 8,914,814 B1 | 12/2014 | Middleton et al. | |
| 8,924,528 B1 | 12/2014 | Richardson et al. | |
| 8,930,513 B1 | 1/2015 | Richardson et al. | |
| 8,930,544 B2 | 1/2015 | Richardson et al. | |
| 8,935,744 B2 | 1/2015 | Osterweil et al. | |
| 8,938,526 B1 | 1/2015 | Richardson et al. | |
| 8,949,161 B2 | 2/2015 | Borst et al. | |
| 8,949,459 B1 | 2/2015 | Scholl | |
| 8,966,318 B1 | 2/2015 | Shah | |
| 8,972,580 B2 | 3/2015 | Fleischman et al. | |
| 8,976,711 B2 | 3/2015 | Li et al. | |
| 9,003,035 B1 | 4/2015 | Richardson et al. | |
| 9,003,040 B2 | 4/2015 | MacCarthaigh et al. | |
| 9,009,286 B2 | 4/2015 | Sivasubramanian et al. | |
| 9,009,334 B1 | 4/2015 | Jenkins et al. | |
| 9,021,127 B2 | 4/2015 | Richardson et al. | |
| 9,021,128 B2 | 4/2015 | Sivasubramanian et al. | |
| 9,021,129 B2 | 4/2015 | Richardson et al. | |
| 9,026,616 B2 | 5/2015 | Sivasubramanian et al. | |
| 9,037,975 B1 | 5/2015 | Taylor et al. | |
| 9,075,777 B1 | 7/2015 | Pope et al. | |
| 9,075,893 B1 | 7/2015 | Jenkins | |
| 9,083,675 B2 | 7/2015 | Richardson et al. | |
| 9,083,743 B1 | 7/2015 | Patel et al. | |
| 9,106,701 B2 | 8/2015 | Richardson et al. | |
| 9,116,803 B1 | 8/2015 | Agrawal et al. | |
| 9,118,680 B1 | 8/2015 | Dunlap et al. | |
| 9,130,756 B2 | 9/2015 | Richardson et al. | |
| 9,130,977 B2 | 9/2015 | Zisapel et al. | |
| 9,137,210 B1 | 9/2015 | Joglekar et al. | |
| 9,137,301 B1 | 9/2015 | Dunlap et al. | |
| 9,137,302 B1 | 9/2015 | Makhijani et al. | |
| 9,154,551 B1 | 10/2015 | Watson | |
| 9,160,703 B2 | 10/2015 | Richardson et al. | |
| 9,172,674 B1 | 10/2015 | Patel et al. | |
| 9,176,894 B2 | 11/2015 | Marshall et al. | |
| 9,185,012 B2 | 11/2015 | Richardson et al. | |
| 9,191,338 B2 | 11/2015 | Richardson et al. | |
| 9,191,458 B2 | 11/2015 | Richardson et al. | |
| 9,195,996 B1 | 11/2015 | Walsh et al. | |
| 9,208,097 B2 | 12/2015 | Richardson et al. | |
| 9,210,235 B2 | 12/2015 | Sivasubramanian et al. | |
| 9,219,686 B2 | 12/2015 | Hilt et al. | |
| 9,237,087 B1 | 1/2016 | Risbood et al. | |
| 9,237,114 B2 | 1/2016 | Richardson et al. | |
| 9,240,954 B1 | 1/2016 | Ellsworth et al. | |
| 9,246,776 B2 | 1/2016 | Ellsworth et al. | |
| 9,251,112 B2 | 2/2016 | Richardson et al. | |
| 9,253,065 B2 | 2/2016 | Richardson et al. | |
| 9,276,812 B1 | 3/2016 | Nagargadde et al. | |
| 9,294,391 B1 | 3/2016 | Mostert | |
| 9,323,577 B2 | 4/2016 | Marr et al. | |
| 9,332,078 B2 | 5/2016 | Sivasubramanian et al. | |
| 9,386,038 B2 | 7/2016 | Martini | |
| 9,391,949 B1 | 7/2016 | Richardson et al. | |
| 9,407,539 B1 | 8/2016 | Dickinson et al. | |
| 9,407,676 B2 | 8/2016 | Archer et al. | |
| 9,407,681 B1 | 8/2016 | Richardson et al. | |
| 9,407,699 B2 | 8/2016 | Sivasubramanian et al. | |
| 9,444,718 B2 | 9/2016 | Khakpour et al. | |
| 9,444,759 B2 | 9/2016 | Richardson et al. | |
| 9,479,476 B2 | 10/2016 | Richardson et al. | |
| 9,495,338 B1 | 11/2016 | Hollis et al. | |
| 9,497,259 B1 | 11/2016 | Richardson et al. | |
| 9,515,949 B2 | 12/2016 | Richardson et al. | |
| 9,525,659 B1 | 12/2016 | Sonkin et al. | |
| 9,544,394 B2 | 1/2017 | Richardson et al. | |
| 9,571,389 B2 | 2/2017 | Richardson et al. | |
| 9,584,328 B1 | 2/2017 | Graham-cumming | |
| 9,590,946 B2 | 3/2017 | Richardson et al. | |
| 9,608,957 B2 | 3/2017 | Sivasubramanian et al. | |
| 9,621,660 B2 | 4/2017 | Sivasubramanian et al. | |
| 9,628,509 B2 | 4/2017 | Holloway et al. | |
| 9,628,554 B2 | 4/2017 | Marshall et al. | |
| 9,645,808 B1 | 5/2017 | Turpie | |
| 9,703,713 B2 | 7/2017 | Nadgowda | |
| 9,705,922 B2 | 7/2017 | Foxhoven et al. | |
| 9,712,325 B2 | 7/2017 | Richardson et al. | |
| 9,712,484 B1 | 7/2017 | Richardson et al. | |
| 9,734,472 B2 | 8/2017 | Richardson et al. | |
| 9,742,795 B1 | 8/2017 | Radlein et al. | |
| 9,760,420 B1 | 9/2017 | Letz et al. | |
| 9,774,619 B1 | 9/2017 | Radlein et al. | |
| 9,787,599 B2 | 10/2017 | Richardson et al. | |
| 9,787,775 B1 | 10/2017 | Richardson et al. | |
| 9,794,216 B2 | 10/2017 | Richardson et al. | |
| 9,794,281 B1 | 10/2017 | Radlein et al. | |
| 9,800,539 B2 | 10/2017 | Richardson et al. | |
| 9,811,451 B1 | 11/2017 | Arguelles et al. | |
| 9,819,567 B1 | 11/2017 | Uppal et al. | |
| 9,832,141 B1 | 11/2017 | Raftery | |
| 9,871,794 B2 | 1/2018 | Joffe et al. | |
| 9,887,914 B2 | 2/2018 | Bergman | |
| 9,887,915 B2 | 2/2018 | Richardson et al. | |
| 9,887,931 B1 | 2/2018 | Uppal et al. | |
| 9,887,932 B1 | 2/2018 | Uppal et al. | |
| 9,888,089 B2 | 2/2018 | Sivasubramanian et al. | |
| 9,893,957 B2 | 2/2018 | Ellsworth et al. | |
| 9,894,168 B2 | 2/2018 | Sivasubramanian et al. | |
| 9,900,402 B1 | 2/2018 | Li et al. | |
| 9,912,740 B2 | 3/2018 | Richardson et al. | |
| 9,929,959 B2 | 3/2018 | Mostert | |
| 9,930,131 B2 | 3/2018 | MacCarthaigh et al. | |
| 9,954,934 B2 | 4/2018 | Sivasubramanian et al. | |
| 9,985,927 B2 | 5/2018 | Richardson et al. | |
| 9,992,086 B1 | 6/2018 | Mizik et al. | |
| 9,992,303 B2 | 6/2018 | Richardson et al. | |
| 10,015,237 B2 | 7/2018 | Richardson et al. | |
| 10,015,241 B2 | 7/2018 | Marr et al. | |
| 10,021,179 B1 | 7/2018 | Velummylum et al. | |
| 10,027,582 B2 | 7/2018 | Richardson et al. | |
| 10,033,627 B1 | 7/2018 | Howard et al. | |
| 10,033,691 B1 | 7/2018 | Mizik et al. | |
| 10,033,699 B2 | 7/2018 | Sullivan et al. | |
| 10,049,051 B1 | 8/2018 | Baldwin | |
| 10,075,551 B1 | 9/2018 | Baldwin et al. | |
| 10,079,742 B1 | 9/2018 | Richardson et al. | |
| 10,091,096 B1 | 10/2018 | Howard et al. | |
| 10,097,398 B1 | 10/2018 | Richardson et al. | |
| 10,097,448 B1 | 10/2018 | Howard et al. | |
| 10,097,566 B1 | 10/2018 | Radlein et al. | |
| 10,110,694 B1 | 10/2018 | Watson et al. | |
| 10,116,584 B2 | 10/2018 | Richardson et al. | |
| 10,135,620 B2 | 11/2018 | Richardson et al. | |
| 10,157,135 B2 | 12/2018 | Richardson et al. | |
| 10,158,729 B2 | 12/2018 | Sivasubramanian et al. | |
| 10,162,753 B2 | 12/2018 | Marshall et al. | |
| 10,180,993 B2 | 1/2019 | Raftery | |
| 10,200,402 B2 | 2/2019 | Radlein et al. | |
| 10,200,492 B2 | 2/2019 | MacCarthaigh et al. | |
| 10,205,698 B1 | 2/2019 | Petersen et al. | |
| 10,218,584 B2 | 2/2019 | Ellsworth et al. | |
| 10,225,322 B2 | 3/2019 | Richardson et al. | |
| 10,225,326 B1 | 3/2019 | Puchala et al. | |
| 10,225,362 B2 | 3/2019 | Watson | |
| 10,230,819 B2 | 3/2019 | Richardson et al. | |
| 10,257,307 B1 | 4/2019 | Baldwin | |
| 10,264,062 B2 | 4/2019 | Richardson et al. | |
| 10,270,878 B1 | 4/2019 | Uppal et al. | |
| 10,305,797 B2 | 5/2019 | Richardson et al. | |
| 10,348,639 B2 | 7/2019 | Puchala et al. | |
| 10,374,955 B2 | 8/2019 | Mostert | |

(56) References Cited

U.S. PATENT DOCUMENTS 10,447,648 B2 10/2019 Bliss et al.
10,467,042 B1 11/2019 Mercier et al.
10,469,355 B2 11/2019 Uppal et al.
10,469,513 B2 11/2019 Uppal et al.
10,491,534 B2 11/2019 Richardson et al.
10,505,961 B2 12/2019 Uppal et al.
10,506,029 B2 12/2019 Hollis et al.
10,511,567 B2 12/2019 Richardson et al.
10,516,590 B2 12/2019 Mizik et al.
10,521,348 B2 12/2019 Marshall et al.
10,523,783 B2 12/2019 Richardson et al.
10,530,874 B2 1/2020 Sivasubramanian et al.
10,542,079 B2 1/2020 Marr et al.
10,554,748 B2 2/2020 Sivasubramanian et al.
2001/0000811 A1 5/2001 May et al.
2001/0025305 A1 9/2001 Yoshiasa et al.
2001/0027479 A1 10/2001 Delaney et al.
2001/0032133 A1 10/2001 Moran
2001/0034704 A1 10/2001 Farhat et al.
2001/0049741 A1 12/2001 Skene et al.
2001/0052016 A1 12/2001 Skene et al.
2001/0056416 A1 12/2001 Garcia-Luna-Aceves
2001/0056500 A1 12/2001 Farber et al.
2002/0002613 A1 1/2002 Freeman et al.
2002/0004816 A1 1/2002 Vange et al.
2002/0004846 A1 1/2002 Garcia-Luna-Aceves et al.
2002/0007413 A1* 1/2002 Garcia-Luna-Aceves .................. H04L 29/12594 709/229
2002/0010783 A1 1/2002 Primak et al.
2002/0010798 A1 1/2002 Ben-Shaul et al.
2002/0016831 A1 2/2002 Peled et al.
2002/0035624 A1 3/2002 Kim
2002/0048269 A1 4/2002 Hong et al.
2002/0049608 A1 4/2002 Hartsell et al.
2002/0049842 A1 4/2002 Huetsch et al.
2002/0049857 A1 4/2002 Farber et al.
2002/0052942 A1* 5/2002 Swildens ................ H04L 67/06 709/223
2002/0062372 A1 5/2002 Hong et al.
2002/0065910 A1 5/2002 Dutta
2002/0068554 A1 6/2002 Dusse
2002/0069420 A1* 6/2002 Russell ............... H04L 63/0428 725/92
2002/0078233 A1 6/2002 Biliris et al.
2002/0082858 A1 6/2002 Heddaya et al.
2002/0083118 A1* 6/2002 Sim ...................... H04L 47/125 718/105
2002/0083148 A1 6/2002 Shaw et al.
2002/0083178 A1 6/2002 Brothers
2002/0083198 A1 6/2002 Kim et al.
2002/0087374 A1 7/2002 Boubez et al.
2002/0091786 A1 7/2002 Yamaguchi et al.
2002/0091801 A1 7/2002 Lewin et al.
2002/0092026 A1 7/2002 Janniello et al.
2002/0099616 A1 7/2002 Sweldens
2002/0099850 A1* 7/2002 Farber ................. H04L 67/2804 709/245
2002/0101836 A1 8/2002 Dorenbosch
2002/0103820 A1 8/2002 Cartmell et al.
2002/0103972 A1 8/2002 Satran et al.
2002/0107944 A1 8/2002 Bai et al.
2002/0112049 A1 8/2002 Elnozahy et al.
2002/0112123 A1 8/2002 Becker et al.
2002/0116481 A1* 8/2002 Lee ..................... H04L 67/2842 709/220
2002/0116491 A1 8/2002 Boyd et al.
2002/0116582 A1 8/2002 Copeland et al.
2002/0120666 A1 8/2002 Landsman et al.
2002/0120782 A1 8/2002 Dillon et al.
2002/0124047 A1 9/2002 Gartner et al.
2002/0124098 A1* 9/2002 Shaw .................... H04L 65/607 709/231
2002/0129123 A1 9/2002 Johnson et al.
2002/0131428 A1 9/2002 Pecus et al.
2002/0133741 A1 9/2002 Maeda et al.
2002/0135611 A1 9/2002 Deosaran et al.
2002/0138286 A1 9/2002 Engstrom
2002/0138437 A1* 9/2002 Lewin .................. H04L 67/306 705/51
2002/0138443 A1 9/2002 Schran et al.
2002/0138649 A1 9/2002 Cartmell et al.
2002/0138761 A1* 9/2002 Kanemaki ........ G06Q 20/40145 726/7
2002/0143675 A1 10/2002 Orshan
2002/0143798 A1 10/2002 Lisiecki et al.
2002/0143989 A1 10/2002 Huitema et al.
2002/0145993 A1 10/2002 Chowdhury et al.
2002/0147770 A1 10/2002 Tang
2002/0147774 A1 10/2002 Lisiecki et al.
2002/0150094 A1 10/2002 Cheng et al.
2002/0150276 A1 10/2002 Chang
2002/0152326 A1 10/2002 Orshan
2002/0154157 A1 10/2002 Sherr et al.
2002/0156884 A1 10/2002 Bertram et al.
2002/0156911 A1 10/2002 Croman et al.
2002/0161745 A1 10/2002 Call
2002/0161767 A1 10/2002 Shapiro et al.
2002/0163882 A1* 11/2002 Bornstein ............... H04L 29/06 370/227
2002/0165912 A1 11/2002 Wenocur et al.
2002/0169890 A1 11/2002 Beaumont et al.
2002/0184368 A1 12/2002 Wang
2002/0188722 A1 12/2002 Banerjee et al.
2002/0194324 A1 12/2002 Guha
2002/0194382 A1 12/2002 Kausik et al.
2002/0198953 A1 12/2002 O'Rourke et al.
2003/0002484 A1* 1/2003 Freedman ............. H04L 69/329 370/352
2003/0004998 A1 1/2003 Datta
2003/0005036 A1 1/2003 Mitzenmacher
2003/0005111 A1 1/2003 Allan
2003/0007482 A1 1/2003 Khello et al.
2003/0009488 A1 1/2003 Hart, III
2003/0009591 A1 1/2003 Hayball et al.
2003/0026410 A1 2/2003 Lumsden
2003/0028642 A1 2/2003 Agarwal et al.
2003/0033283 A1 2/2003 Evans et al.
2003/0037108 A1 2/2003 Peiffer et al.
2003/0037139 A1 2/2003 Shteyn
2003/0037284 A1 2/2003 Srinivasan et al.
2003/0041094 A1 2/2003 Lara et al.
2003/0046343 A1 3/2003 Krishnamurthy et al.
2003/0065739 A1 4/2003 Shnier
2003/0070096 A1 4/2003 Pazi et al.
2003/0074401 A1 4/2003 Connell et al.
2003/0074471 A1 4/2003 Anderson et al.
2003/0074472 A1 4/2003 Lucco et al.
2003/0079027 A1 4/2003 Slocombe et al.
2003/0093523 A1 5/2003 Cranor et al.
2003/0099202 A1 5/2003 Lear et al.
2003/0099237 A1 5/2003 Mitra et al.
2003/0101278 A1 5/2003 Garcia-Luna-Aceves et al.
2003/0105829 A1 6/2003 Hayward
2003/0105857 A1 6/2003 Kamen et al.
2003/0112792 A1 6/2003 Cranor et al.
2003/0120741 A1 6/2003 Wu et al.
2003/0126387 A1 7/2003 Watanabe
2003/0133554 A1 7/2003 Nykanen et al.
2003/0135467 A1 7/2003 Okamoto
2003/0135509 A1 7/2003 Davis et al.
2003/0140087 A1 7/2003 Lincoln et al.
2003/0145038 A1 7/2003 Bin Tariq et al.
2003/0145066 A1* 7/2003 Okada ..................... H04L 61/35 709/219
2003/0149581 A1* 8/2003 Chaudhri ............... G06Q 30/06 709/203
2003/0154239 A1* 8/2003 Davis .................. H04L 67/1002 709/201
2003/0154284 A1 8/2003 Bernardin et al.
2003/0163722 A1 8/2003 Anderson, IV
2003/0172145 A1 9/2003 Nguyen
2003/0172183 A1 9/2003 Anderson, IV et al.

(56) References Cited

U.S. PATENT DOCUMENTS

2003/0172291 A1 9/2003 Judge et al.
2003/0174648 A1* 9/2003 Wang .................... H04L 67/288 370/235
2003/0177321 A1 9/2003 Watanabe
2003/0182305 A1 9/2003 Balva et al.
2003/0182413 A1 9/2003 Allen et al.
2003/0182447 A1 9/2003 Schilling
2003/0187935 A1 10/2003 Agarwalla et al.
2003/0187970 A1 10/2003 Chase et al.
2003/0191822 A1* 10/2003 Leighton ................. H04L 61/30 709/219
2003/0200394 A1 10/2003 Ashmore et al.
2003/0204602 A1* 10/2003 Hudson ................... H04L 67/06 709/228
2003/0206520 A1 11/2003 Wu et al.
2003/0221000 A1 11/2003 Cherkasova et al.
2003/0229682 A1* 12/2003 Day .................... H04L 67/1008 709/219
2003/0233423 A1* 12/2003 Dilley ..................... H04L 29/06 709/214
2003/0233445 A1 12/2003 Levy et al.
2003/0233455 A1 12/2003 Leber et al.
2003/0236700 A1 12/2003 Arning et al.
2003/0236779 A1 12/2003 Choi et al.
2004/0003032 A1 1/2004 Ma et al.
2004/0010562 A1 1/2004 Itonaga
2004/0010563 A1 1/2004 Forte et al.
2004/0010588 A1 1/2004 Slater et al.
2004/0010601 A1 1/2004 Afergan
2004/0010621 A1* 1/2004 Afergan .................. H04L 12/66 709/247
2004/0010683 A1 1/2004 Huitema
2004/0015584 A1 1/2004 Cartmell et al.
2004/0019518 A1 1/2004 Abraham et al.
2004/0024841 A1 2/2004 Becker et al.
2004/0030620 A1 2/2004 Benjamin et al.
2004/0032278 A1 2/2004 Orii et al.
2004/0034744 A1 2/2004 Karlsson et al.
2004/0039798 A1 2/2004 Hotz et al.
2004/0044731 A1 3/2004 Chen et al.
2004/0044791 A1 3/2004 Pouzzner
2004/0054757 A1 3/2004 Ueda et al.
2004/0059805 A1 3/2004 Dinker et al.
2004/0064335 A1 4/2004 Yang
2004/0064501 A1 4/2004 Jan et al.
2004/0068542 A1 4/2004 Lalonde et al.
2004/0073596 A1* 4/2004 Kloninger ............... H04L 67/16 709/200
2004/0073707 A1 4/2004 Dillon
2004/0073867 A1 4/2004 Kausik et al.
2004/0078468 A1 4/2004 Hedin et al.
2004/0078487 A1 4/2004 Cernohous et al.
2004/0083283 A1 4/2004 Sundaram et al.
2004/0083307 A1 4/2004 Uysal
2004/0098478 A1 5/2004 Koetke et al.
2004/0105544 A1 6/2004 Haneda et al.
2004/0114579 A1 6/2004 Karaoguz et al.
2004/0117309 A1 6/2004 Inoue et al.
2004/0117455 A1 6/2004 Kaminksy et al.
2004/0128344 A1 7/2004 Trossen
2004/0128346 A1 7/2004 Melamed et al.
2004/0148520 A1 7/2004 Talpade et al.
2004/0167981 A1* 8/2004 Douglas .................. H04L 41/22 709/225
2004/0167982 A1 8/2004 Cohen et al.
2004/0170379 A1 9/2004 Yao et al.
2004/0172466 A1 9/2004 Douglas et al.
2004/0184456 A1 9/2004 Binding et al.
2004/0194085 A1 9/2004 Beaubien et al.
2004/0194102 A1 9/2004 Neerdaels
2004/0203630 A1 10/2004 Wang
2004/0205149 A1 10/2004 Dillon et al.
2004/0205162 A1* 10/2004 Parikh ............... H04L 29/12066 709/219
2004/0215823 A1 10/2004 Kleinfelter et al.
2004/0221019 A1 11/2004 Swildens et al.
2004/0221034 A1 11/2004 Kausik et al.
2004/0246948 A1 12/2004 Lee et al.
2004/0249939 A1 12/2004 Amini et al.
2004/0249971 A1 12/2004 Klinker
2004/0249975 A1 12/2004 Tuck et al.
2004/0250119 A1 12/2004 Shelest et al.
2004/0254921 A1 12/2004 Cohen et al.
2004/0267906 A1 12/2004 Truty
2004/0267907 A1 12/2004 Gustafsson
2005/0010653 A1* 1/2005 McCanne ......... H04L 29/12009 709/219
2005/0015471 A1 1/2005 Zhang et al.
2005/0021706 A1* 1/2005 Maggi ..................... H04L 29/06 709/223
2005/0021862 A1 1/2005 Schroeder et al.
2005/0027882 A1 2/2005 Sullivan et al.
2005/0038967 A1 2/2005 Umbehocker et al.
2005/0039019 A1 2/2005 Delany
2005/0044270 A1 2/2005 Grove et al.
2005/0102683 A1 5/2005 Branson et al.
2005/0108169 A1 5/2005 Balasubramanian et al.
2005/0108262 A1 5/2005 Fawcett
2005/0108529 A1* 5/2005 Juneau ............... H04N 21/6543 713/168
2005/0114296 A1* 5/2005 Farber ................... G06F 16/164
2005/0117717 A1 6/2005 Lumsden
2005/0132083 A1 6/2005 Raciborski et al.
2005/0147088 A1 7/2005 Bao et al.
2005/0149529 A1 7/2005 Gutmans
2005/0157712 A1 7/2005 Rangarajan et al.
2005/0160133 A1 7/2005 Greenlee et al.
2005/0163168 A1 7/2005 Sheth et al.
2005/0168782 A1 8/2005 Kobashi et al.
2005/0171959 A1 8/2005 Deforche et al.
2005/0172080 A1 8/2005 Miyauchi
2005/0174989 A1 8/2005 Chen et al.
2005/0181769 A1 8/2005 Kogawa
2005/0188073 A1 8/2005 Nakamichi et al.
2005/0192008 A1 9/2005 Desai et al.
2005/0192814 A1 9/2005 Challener et al.
2005/0198170 A1 9/2005 LeMay et al.
2005/0198200 A1 9/2005 Subramanian et al.
2005/0198303 A1 9/2005 Knauerhase et al.
2005/0198334 A1 9/2005 Farber et al.
2005/0198453 A1 9/2005 Osaki
2005/0198571 A1 9/2005 Kramer et al.
2005/0201302 A1 9/2005 Gaddis et al.
2005/0216483 A1 9/2005 Armstrong et al.
2005/0216569 A1* 9/2005 Coppola ............. H04L 61/2076 709/213
2005/0216674 A1 9/2005 Robbin et al.
2005/0223095 A1 10/2005 Volz et al.
2005/0228856 A1 10/2005 Swildens et al.
2005/0229119 A1 10/2005 Torvinen
2005/0232165 A1 10/2005 Brawn et al.
2005/0234864 A1 10/2005 Shapiro
2005/0240574 A1 10/2005 Challenger et al.
2005/0256880 A1 11/2005 Nam Koong et al.
2005/0259645 A1 11/2005 Chen et al.
2005/0259672 A1 11/2005 Eduri
2005/0262248 A1 11/2005 Jennings, III et al.
2005/0266835 A1 12/2005 Agrawal et al.
2005/0267928 A1 12/2005 Anderson et al.
2005/0267937 A1 12/2005 Daniels et al.
2005/0267991 A1 12/2005 Huitema et al.
2005/0267992 A1 12/2005 Huitema et al.
2005/0267993 A1 12/2005 Huitema et al.
2005/0278259 A1 12/2005 Gunaseelan et al.
2005/0283759 A1 12/2005 Peteanu et al.
2005/0283784 A1 12/2005 Suzuki
2005/0286564 A1 12/2005 Hatley et al.
2006/0005014 A1 1/2006 Aura et al.
2006/0013158 A1* 1/2006 Ahuja ............... H04L 29/12066 370/328
2006/0020596 A1 1/2006 Liu et al.
2006/0020684 A1* 1/2006 Mukherjee .......... H04L 67/2804 709/219

(56) References Cited

U.S. PATENT DOCUMENTS

2006/0020714 A1 1/2006 Girouard et al.
2006/0020715 A1 1/2006 Jungck
2006/0021001 A1 1/2006 Giles et al.
2006/0026067 A1 2/2006 Nicholas et al.
2006/0026154 A1 2/2006 Altinel et al.
2006/0031239 A1 2/2006 Koenig
2006/0031319 A1 2/2006 Nelson et al.
2006/0031503 A1 2/2006 Gilbert
2006/0034494 A1 2/2006 Holloran
2006/0036720 A1 2/2006 Faulk, Jr.
2006/0036966 A1 2/2006 Yevdayev
2006/0037037 A1 2/2006 Miranz
2006/0039352 A1 2/2006 Karstens
2006/0041614 A1 2/2006 Oe
2006/0045005 A1 3/2006 Blackmore et al.
2006/0047787 A1 3/2006 Aggarwal et al.
2006/0047813 A1 3/2006 Aggarwal et al.
2006/0059246 A1 3/2006 Grove
2006/0063534 A1 3/2006 Kokkonen et al.
2006/0064476 A1 3/2006 Decasper et al.
2006/0064500 A1 3/2006 Roth et al.
2006/0070060 A1 3/2006 Tantawi et al.
2006/0074750 A1 4/2006 Clark et al.
2006/0075084 A1 4/2006 Lyon
2006/0075139 A1 4/2006 Jungck
2006/0083165 A1 4/2006 McLane et al.
2006/0085536 A1 4/2006 Meyer et al.
2006/0088026 A1 4/2006 Mazur et al.
2006/0106938 A1 5/2006 Dini et al.
2006/0107036 A1 5/2006 Randle et al.
2006/0112066 A1 5/2006 Hamzy
2006/0112176 A1* 5/2006 Liu .................. H04L 29/12811 709/245
2006/0120385 A1* 6/2006 Atchison ................. H04L 63/10 370/400
2006/0129665 A1 6/2006 Toebes et al.
2006/0129766 A1 6/2006 Cassia et al.
2006/0136453 A1 6/2006 Kwan
2006/0143293 A1* 6/2006 Freedman ............. H04L 45/302 709/225
2006/0143442 A1 6/2006 Smith
2006/0146820 A1 7/2006 Friedman et al.
2006/0149529 A1 7/2006 Nguyen et al.
2006/0155823 A1 7/2006 Tran et al.
2006/0155862 A1 7/2006 Kathi et al.
2006/0161541 A1 7/2006 Cencini
2006/0165051 A1 7/2006 Banerjee et al.
2006/0168088 A1* 7/2006 Leighton ................. H04L 67/02 709/207
2006/0173957 A1 8/2006 Robinson
2006/0179080 A1 8/2006 Meek et al.
2006/0184936 A1 8/2006 Abels et al.
2006/0188097 A1 8/2006 Taniguchi et al.
2006/0190605 A1 8/2006 Franz et al.
2006/0193247 A1 8/2006 Naseh et al.
2006/0195866 A1 8/2006 Thukral
2006/0206568 A1 9/2006 Verma et al.
2006/0206586 A1 9/2006 Ling et al.
2006/0218265 A1 9/2006 Farber et al.
2006/0218304 A1 9/2006 Mukherjee et al.
2006/0221971 A1 10/2006 Andrieux et al.
2006/0224752 A1 10/2006 Parekh et al.
2006/0227740 A1 10/2006 McLaughlin et al.
2006/0227758 A1 10/2006 Rana et al.
2006/0230137 A1 10/2006 Gare et al.
2006/0230265 A1 10/2006 Krishna
2006/0233155 A1 10/2006 Srivastava
2006/0242227 A1 10/2006 Rao
2006/0253546 A1 11/2006 Chang et al.
2006/0253609 A1 11/2006 Andreev et al.
2006/0259581 A1 11/2006 Piersol
2006/0259690 A1 11/2006 Vittal et al.
2006/0259984 A1* 11/2006 Juneau .................... H04L 67/18 726/28
2006/0265497 A1 11/2006 Ohata et al.
2006/0265508 A1 11/2006 Angel et al.
2006/0265516 A1 11/2006 Schilling
2006/0265720 A1 11/2006 Cai et al.
2006/0271641 A1 11/2006 Stavrakos et al.
2006/0282522 A1* 12/2006 Lewin ..................... H04L 29/06 709/223
2006/0288119 A1 12/2006 Kim et al.
2006/0288424 A1 12/2006 Saito
2007/0005689 A1 1/2007 Leighton et al.
2007/0005801 A1 1/2007 Kumar et al.
2007/0005892 A1 1/2007 Mullender et al.
2007/0011267 A1 1/2007 Overton et al.
2007/0014241 A1 1/2007 Banerjee et al.
2007/0021998 A1 1/2007 Laithwaite et al.
2007/0028001 A1 2/2007 Phillips et al.
2007/0038729 A1 2/2007 Sullivan et al.
2007/0038994 A1* 2/2007 Davis ...................... H04L 67/10 717/174
2007/0041393 A1 2/2007 Westhead et al.
2007/0043667 A1 2/2007 Qawami et al.
2007/0043859 A1 2/2007 Ruul
2007/0050522 A1 3/2007 Grove et al.
2007/0050703 A1 3/2007 Lebel
2007/0055764 A1* 3/2007 Dilley ................. H04L 67/2819 709/223
2007/0055765 A1 3/2007 Lisiecki et al.
2007/0061440 A1 3/2007 Sundaram et al.
2007/0064610 A1 3/2007 Khandani
2007/0076872 A1* 4/2007 Juneau ............... H04N 21/4524 380/202
2007/0086429 A1 4/2007 Lawrence et al.
2007/0094361 A1 4/2007 Hoynowski et al.
2007/0101061 A1 5/2007 Baskaran et al.
2007/0101377 A1 5/2007 Six et al.
2007/0118667 A1* 5/2007 McCarthy ........... H04L 67/1034 709/238
2007/0118668 A1* 5/2007 McCarthy ........... H04L 61/1511 709/238
2007/0134641 A1 6/2007 Lieu
2007/0156726 A1 7/2007 Levy
2007/0156919 A1 7/2007 Potti et al.
2007/0162331 A1 7/2007 Sullivan
2007/0168336 A1 7/2007 Ransil et al.
2007/0168517 A1* 7/2007 Weller .................. G06Q 40/04 709/226
2007/0174426 A1* 7/2007 Swildens ............ H04L 61/1541 709/217
2007/0174442 A1* 7/2007 Sherman ................. H04L 63/14 709/223
2007/0174490 A1 7/2007 Choi et al.
2007/0183342 A1 8/2007 Wong et al.
2007/0198982 A1 8/2007 Bolan et al.
2007/0204107 A1 8/2007 Greenfield et al.
2007/0208737 A1 9/2007 Li et al.
2007/0214232 A1 9/2007 Belimpasakis et al.
2007/0219795 A1 9/2007 Park et al.
2007/0220010 A1* 9/2007 Ertugrul .............. G06F 16/9535
2007/0226294 A1 9/2007 Pruitt et al.
2007/0233705 A1 10/2007 Farber et al.
2007/0233706 A1 10/2007 Farber et al.
2007/0233846 A1 10/2007 Farber et al.
2007/0233884 A1 10/2007 Farber et al.
2007/0233896 A1 10/2007 Hilt et al.
2007/0242824 A1 10/2007 Vishik
2007/0243860 A1 10/2007 Aiello et al.
2007/0244964 A1 10/2007 Challenger et al.
2007/0245022 A1 10/2007 Olliphant et al.
2007/0250467 A1 10/2007 Mesnik et al.
2007/0250468 A1 10/2007 Pieper
2007/0250560 A1* 10/2007 Wein .................. H04L 67/1008 709/201
2007/0250601 A1 10/2007 Amlekar et al.
2007/0250611 A1 10/2007 Bhogal et al.
2007/0253377 A1 11/2007 Janneteau et al.
2007/0255843 A1 11/2007 Zubev
2007/0263604 A1 11/2007 Tal
2007/0266113 A1 11/2007 Koopmans et al.

(56) References Cited

U.S. PATENT DOCUMENTS

2007/0266311 A1 11/2007 Westphal
2007/0266333 A1 11/2007 Cossey et al.
2007/0270165 A1 11/2007 Poosala
2007/0271375 A1 11/2007 Hwang
2007/0271385 A1* 11/2007 Davis .................... H04L 67/142 709/228
2007/0271560 A1 11/2007 Wahlert et al.
2007/0271608 A1 11/2007 Shimizu et al.
2007/0280197 A1 12/2007 Pearlman et al.
2007/0280229 A1 12/2007 Kenney
2007/0281689 A1 12/2007 Altman et al.
2007/0288588 A1* 12/2007 Wein ................... H04L 65/1063 709/214
2007/0291739 A1 12/2007 Sullivan et al.
2007/0294419 A1 12/2007 Ulevitch
2008/0005057 A1 1/2008 Ozzie et al.
2008/0008089 A1* 1/2008 Bornstein ............... H04L 29/06 370/227
2008/0016233 A1 1/2008 Schneider
2008/0025304 A1* 1/2008 Venkataswami ..... H04N 21/238 370/390
2008/0037536 A1 2/2008 Padmanabhan et al.
2008/0046550 A1 2/2008 Mazur et al.
2008/0046596 A1* 2/2008 Afergan ................ G06F 15/167 709/247
2008/0049615 A1 2/2008 Bugenhagen
2008/0056207 A1 3/2008 Eriksson et al.
2008/0062997 A1 3/2008 Nix
2008/0065724 A1* 3/2008 Seed ................... H04L 67/2842 709/203
2008/0065745 A1* 3/2008 Leighton ................. H04L 43/04 709/219
2008/0066072 A1 3/2008 Yurekli et al.
2008/0071859 A1* 3/2008 Seed ................... H04L 67/2842 709/203
2008/0071987 A1 3/2008 Karn et al.
2008/0072264 A1 3/2008 Crayford
2008/0082551 A1* 4/2008 Farber ..................... G06F 16/13
2008/0082662 A1 4/2008 Dandliker et al.
2008/0086434 A1 4/2008 Chesla
2008/0086559 A1 4/2008 Davis et al.
2008/0086574 A1* 4/2008 Raciborski .......... H04L 61/1511 709/245
2008/0092242 A1 4/2008 Rowley
2008/0101358 A1 5/2008 Van Ewijk et al.
2008/0103805 A1 5/2008 Shear et al.
2008/0104268 A1* 5/2008 Farber ..................... G06F 9/505 709/233
2008/0109679 A1 5/2008 Wright et al.
2008/0114829 A1 5/2008 Button et al.
2008/0125077 A1 5/2008 Velazquez et al.
2008/0126706 A1 5/2008 Newport et al.
2008/0134043 A1 6/2008 Georgis et al.
2008/0140800 A1 6/2008 Farber et al.
2008/0147866 A1* 6/2008 Stolorz ................... H04L 41/22 709/226
2008/0147873 A1 6/2008 Matsumoto
2008/0155059 A1 6/2008 Hardin et al.
2008/0155061 A1* 6/2008 Afergan ................ H04L 67/104 709/218
2008/0155613 A1 6/2008 Benya et al.
2008/0155614 A1 6/2008 Cooper et al.
2008/0162667 A1 7/2008 Verma et al.
2008/0162821 A1 7/2008 Duran et al.
2008/0162843 A1 7/2008 Davis et al.
2008/0172488 A1 7/2008 Jawahar et al.
2008/0189437 A1 8/2008 Halley
2008/0201332 A1 8/2008 Souders et al.
2008/0215718 A1* 9/2008 Stolorz ................... H04L 67/18 709/223
2008/0215730 A1 9/2008 Sundaram et al.
2008/0215735 A1* 9/2008 Farber ................. H04L 67/2804 709/226
2008/0215747 A1 9/2008 Menon et al.
2008/0215750 A1* 9/2008 Farber ................. H04L 67/1002 709/233
2008/0215755 A1 9/2008 Farber et al.
2008/0222281 A1* 9/2008 Dilley ................. H04L 67/2828 709/223
2008/0222291 A1* 9/2008 Weller .................. H04L 67/101 709/226
2008/0222295 A1 9/2008 Robinson et al.
2008/0222647 A1 9/2008 Taylor et al.
2008/0225779 A1 9/2008 Bragiel et al.
2008/0228574 A1 9/2008 Stewart et al.
2008/0228920 A1 9/2008 Souders et al.
2008/0235383 A1 9/2008 Schneider
2008/0235400 A1* 9/2008 Slocombe ........... H04L 61/2069 709/245
2008/0256087 A1 10/2008 Piironen et al.
2008/0256175 A1 10/2008 Lee et al.
2008/0263135 A1 10/2008 Olliphant
2008/0270882 A1 10/2008 Rollins et al.
2008/0275772 A1 11/2008 Suryanarayana et al.
2008/0281946 A1 11/2008 Swildens et al.
2008/0281950 A1 11/2008 Wald et al.
2008/0288722 A1 11/2008 Lecoq et al.
2008/0301670 A1 12/2008 Gouge et al.
2008/0312766 A1 12/2008 Couckuyt
2008/0319862 A1 12/2008 Golan et al.
2008/0320123 A1 12/2008 Houlihan et al.
2008/0320269 A1 12/2008 Houlihan et al.
2009/0013063 A1 1/2009 Soman
2009/0016236 A1 1/2009 Alcala et al.
2009/0029644 A1* 1/2009 Sue .................... H04N 21/2547 455/3.02
2009/0031367 A1* 1/2009 Sue .................. H04N 21/26241 725/87
2009/0031368 A1* 1/2009 Ling .................... H04N 21/222 725/87
2009/0031376 A1* 1/2009 Riley ..................... H04N 7/165 725/105
2009/0043900 A1 2/2009 Barber
2009/0049098 A1 2/2009 Pickelsimer et al.
2009/0063038 A1 3/2009 Shrivathsan et al.
2009/0063704 A1 3/2009 Taylor et al.
2009/0070533 A1 3/2009 Elazary et al.
2009/0083228 A1 3/2009 Shatz et al.
2009/0083279 A1 3/2009 Hasek
2009/0086728 A1 4/2009 Gulati et al.
2009/0086741 A1 4/2009 Zhang
2009/0089869 A1 4/2009 Varghese
2009/0094252 A1 4/2009 Wong et al.
2009/0103707 A1 4/2009 McGary et al.
2009/0106202 A1 4/2009 Mizrahi
2009/0106381 A1 4/2009 Kasriel et al.
2009/0112703 A1 4/2009 Brown
2009/0125393 A1 5/2009 Hwang et al.
2009/0125934 A1 5/2009 Jones et al.
2009/0132368 A1 5/2009 Cotter et al.
2009/0132640 A1 5/2009 Verma et al.
2009/0132648 A1 5/2009 Swildens et al.
2009/0138533 A1 5/2009 Iwasaki et al.
2009/0138582 A1 5/2009 Turk
2009/0144411 A1 6/2009 Winkler et al.
2009/0144412 A1 6/2009 Ferguson et al.
2009/0150926 A1 6/2009 Schlack
2009/0157504 A1 6/2009 Braemer et al.
2009/0157850 A1* 6/2009 Gagliardi .............. G06F 16/951 709/219
2009/0158163 A1 6/2009 Stephens et al.
2009/0164331 A1 6/2009 Bishop et al.
2009/0164614 A1 6/2009 Christian et al.
2009/0172167 A1 7/2009 Drai et al.
2009/0177667 A1 7/2009 Ramos et al.
2009/0182815 A1 7/2009 Czechowski et al.
2009/0182837 A1 7/2009 Rogers
2009/0182945 A1 7/2009 Aviles et al.
2009/0187575 A1 7/2009 DaCosta
2009/0198817 A1 8/2009 Sundaram et al.
2009/0204682 A1 8/2009 Jeyaseelan et al.
2009/0210549 A1 8/2009 Hudson et al.

(56) References Cited

U.S. PATENT DOCUMENTS

2009/0228708 A1 9/2009 Trostle
2009/0233623 A1 9/2009 Johnson
2009/0241167 A1 9/2009 Moore
2009/0248697 A1 10/2009 Richardson et al.
2009/0248786 A1 10/2009 Richardson et al.
2009/0248787 A1 10/2009 Sivasubramanian et al.
2009/0248852 A1 10/2009 Fuhrmann et al.
2009/0248858 A1 10/2009 Sivasubramanian et al.
2009/0248893 A1 10/2009 Richardson et al.
2009/0249222 A1 10/2009 Schmidt et al.
2009/0253435 A1 10/2009 Olofsson
2009/0254661 A1 10/2009 Fullagar et al.
2009/0259588 A1 10/2009 Lindsay
2009/0259971 A1 10/2009 Rankine et al.
2009/0262741 A1 10/2009 Jungck et al.
2009/0271498 A1 10/2009 Cable
2009/0271577 A1 10/2009 Campana et al.
2009/0271730 A1 10/2009 Rose et al.
2009/0276771 A1 11/2009 Nickolov et al.
2009/0279444 A1 11/2009 Ravindran et al.
2009/0282038 A1 11/2009 Subotin et al.
2009/0287750 A1 11/2009 Banavar et al.
2009/0307307 A1 12/2009 Igarashi
2009/0327489 A1 12/2009 Swildens et al.
2009/0327517 A1* 12/2009 Sivasubramanian ... H04L 67/02 709/238
2009/0327914 A1 12/2009 Adar et al.
2010/0005175 A1 1/2010 Swildens et al.
2010/0011061 A1 1/2010 Hudson et al.
2010/0011126 A1 1/2010 Hsu et al.
2010/0020699 A1 1/2010 On
2010/0023601 A1 1/2010 Lewin et al.
2010/0023621 A1 1/2010 Ezolt et al.
2010/0030662 A1 2/2010 Klein
2010/0030914 A1 2/2010 Sparks et al.
2010/0034470 A1 2/2010 Valencia-Campo et al.
2010/0036944 A1 2/2010 Douglis et al.
2010/0042725 A1 2/2010 Jeon et al.
2010/0049862 A1 2/2010 Dixon
2010/0057894 A1 3/2010 Glasser
2010/0070603 A1 3/2010 Moss et al.
2010/0070700 A1 3/2010 Borst et al.
2010/0074268 A1 3/2010 Raza
2010/0082320 A1 4/2010 Wood et al.
2010/0082787 A1 4/2010 Kommula et al.
2010/0088367 A1 4/2010 Brown et al.
2010/0088405 A1 4/2010 Huang et al.
2010/0095008 A1 4/2010 Joshi
2010/0100629 A1 4/2010 Raciborski et al.
2010/0103837 A1 4/2010 Jungck et al.
2010/0106934 A1 4/2010 Calder et al.
2010/0111059 A1 5/2010 Bappu et al.
2010/0115133 A1 5/2010 Joshi
2010/0115342 A1 5/2010 Shigeta et al.
2010/0121953 A1 5/2010 Friedman et al.
2010/0121981 A1 5/2010 Drako
2010/0122069 A1 5/2010 Gonion
2010/0125626 A1 5/2010 Lucas et al.
2010/0125673 A1 5/2010 Richardson et al.
2010/0125675 A1 5/2010 Richardson et al.
2010/0131646 A1 5/2010 Drako
2010/0138559 A1 6/2010 Sullivan et al.
2010/0150155 A1 6/2010 Napierala
2010/0161564 A1 6/2010 Lee et al.
2010/0161565 A1 6/2010 Lee et al.
2010/0161799 A1 6/2010 Maloo
2010/0169392 A1 7/2010 Lev Ran et al.
2010/0169452 A1 7/2010 Atluri et al.
2010/0174811 A1 7/2010 Musiri et al.
2010/0191854 A1 7/2010 Isci et al.
2010/0192225 A1 7/2010 Ma et al.
2010/0217801 A1 8/2010 Leighton et al.
2010/0217856 A1 8/2010 Falkena
2010/0223364 A1 9/2010 Wei
2010/0226372 A1 9/2010 Watanabe
2010/0228819 A1 9/2010 Wei
2010/0257024 A1 10/2010 Holmes et al.
2010/0257266 A1 10/2010 Holmes et al.
2010/0257566 A1 10/2010 Matila
2010/0268789 A1 10/2010 Yoo et al.
2010/0268814 A1 10/2010 Cross et al.
2010/0274765 A1 10/2010 Murphy et al.
2010/0281482 A1 11/2010 Pike et al.
2010/0293296 A1 11/2010 Hsu et al.
2010/0293479 A1 11/2010 Rousso et al.
2010/0299427 A1 11/2010 Joshi
2010/0299438 A1 11/2010 Zimmerman et al.
2010/0299439 A1 11/2010 McCarthy et al.
2010/0306382 A1 12/2010 Cardosa et al.
2010/0312861 A1 12/2010 Kolhi et al.
2010/0318508 A1 12/2010 Brawer et al.
2010/0322255 A1 12/2010 Hao et al.
2010/0325365 A1 12/2010 Colglazier et al.
2010/0332595 A1 12/2010 Fullagar et al.
2011/0010244 A1 1/2011 Hatridge
2011/0016214 A1 1/2011 Jackson
2011/0029598 A1 2/2011 Arnold et al.
2011/0035469 A1 2/2011 Smith et al.
2011/0040893 A1 2/2011 Karaoguz et al.
2011/0051738 A1 3/2011 Xu
2011/0055386 A1 3/2011 Middleton et al.
2011/0055714 A1 3/2011 Vemulapalli et al.
2011/0055921 A1 3/2011 Narayanaswamy et al.
2011/0057790 A1 3/2011 Martin et al.
2011/0058675 A1 3/2011 Brueck et al.
2011/0072138 A1 3/2011 Canturk et al.
2011/0072366 A1 3/2011 Spencer
2011/0078000 A1 3/2011 Ma et al.
2011/0078230 A1 3/2011 Sepulveda
2011/0082916 A1 4/2011 Swanson et al.
2011/0085654 A1 4/2011 Jana et al.
2011/0087769 A1 4/2011 Holmes et al.
2011/0093584 A1 4/2011 Qiu et al.
2011/0096987 A1 4/2011 Morales et al.
2011/0106949 A1 5/2011 Patel et al.
2011/0113467 A1 5/2011 Agarwal et al.
2011/0125894 A1 5/2011 Anderson et al.
2011/0153938 A1 6/2011 Verzunov et al.
2011/0153941 A1 6/2011 Spatscheck et al.
2011/0154318 A1 6/2011 Oshins et al.
2011/0154350 A1 6/2011 Doyle et al.
2011/0161461 A1 6/2011 Niven-Jenkins
2011/0166935 A1 7/2011 Armentrout et al.
2011/0182290 A1 7/2011 Perkins
2011/0191445 A1 8/2011 Dazzi
2011/0191446 A1 8/2011 Dazzi et al.
2011/0191447 A1 8/2011 Dazzi et al.
2011/0191449 A1 8/2011 Swildens et al.
2011/0191459 A1 8/2011 Joshi
2011/0196892 A1 8/2011 Xia
2011/0208876 A1 8/2011 Richardson et al.
2011/0208958 A1 8/2011 Stuedi et al.
2011/0209064 A1 8/2011 Jorgensen et al.
2011/0219120 A1 9/2011 Farber et al.
2011/0219372 A1 9/2011 Agarwal et al.
2011/0238501 A1 9/2011 Almeida
2011/0238793 A1 9/2011 Bedare et al.
2011/0239215 A1 9/2011 Sugai
2011/0252142 A1 10/2011 Richardson et al.
2011/0252143 A1 10/2011 Baumback et al.
2011/0255445 A1 10/2011 Johnson et al.
2011/0258049 A1 10/2011 Ramer et al.
2011/0258614 A1 10/2011 Tamm
2011/0270964 A1 11/2011 Huang et al.
2011/0276623 A1 11/2011 Girbal
2011/0296053 A1 12/2011 Medved et al.
2011/0296370 A1 12/2011 Ferris et al.
2011/0296473 A1 12/2011 Babic
2011/0302304 A1 12/2011 Baumback et al.
2011/0307533 A1 12/2011 Saeki
2011/0320522 A1 12/2011 Endres et al.
2011/0320559 A1 12/2011 Foti
2012/0011190 A1 1/2012 Driesen et al.
2012/0023090 A1 1/2012 Holloway et al.

(56) References Cited

U.S. PATENT DOCUMENTS

| | | | |
|---|---|---|---|
| 2012/0023226 | A1 | 1/2012 | Petersen et al. |
| 2012/0036238 | A1 | 2/2012 | Sundaram et al. |
| 2012/0041899 | A1 | 2/2012 | Greene et al. |
| 2012/0041970 | A1 | 2/2012 | Ghosh et al. |
| 2012/0054860 | A1 | 2/2012 | Wyschogrod et al. |
| 2012/0066360 | A1 | 3/2012 | Ghosh |
| 2012/0072600 | A1 | 3/2012 | Richardson et al. |
| 2012/0072608 | A1 | 3/2012 | Peters et al. |
| 2012/0078998 | A1 | 3/2012 | Son et al. |
| 2012/0079096 | A1 | 3/2012 | Cowan et al. |
| 2012/0079115 | A1 | 3/2012 | Richardson et al. |
| 2012/0014249 | A1 | 4/2012 | Mao et al. |
| 2012/0089700 | A1 | 4/2012 | Safruti et al. |
| 2012/0089972 | A1 | 4/2012 | Scheidel et al. |
| 2012/0096065 | A1 | 4/2012 | Suit et al. |
| 2012/0096166 | A1 | 4/2012 | Devarapalli et al. |
| 2012/0110515 | A1 | 5/2012 | Abramoff et al. |
| 2012/0117621 | A1 | 5/2012 | Kondamuru et al. |
| 2012/0124184 | A1 | 5/2012 | Sakata et al. |
| 2012/0131177 | A1 | 5/2012 | Brandt et al. |
| 2012/0136697 | A1 | 5/2012 | Peles et al. |
| 2012/0142310 | A1 | 6/2012 | Pugh et al. |
| 2012/0143688 | A1 | 6/2012 | Alexander |
| 2012/0159476 | A1 | 6/2012 | Ramteke et al. |
| 2012/0166516 | A1 | 6/2012 | Simmons et al. |
| 2012/0169646 | A1 | 7/2012 | Berkes et al. |
| 2012/0173760 | A1 | 7/2012 | Jog et al. |
| 2012/0179796 | A1 | 7/2012 | Nagaraj et al. |
| 2012/0179817 | A1 | 7/2012 | Bade et al. |
| 2012/0179839 | A1 | 7/2012 | Raciborski et al. |
| 2012/0198043 | A1 | 8/2012 | Hesketh et al. |
| 2012/0198071 | A1 | 8/2012 | Black et al. |
| 2012/0209942 | A1 | 8/2012 | Zehavi et al. |
| 2012/0224516 | A1 | 9/2012 | Stojanovski et al. |
| 2012/0226649 | A1 | 9/2012 | Kovacs et al. |
| 2012/0233329 | A1 | 9/2012 | Dickinson et al. |
| 2012/0233522 | A1 | 9/2012 | Barton et al. |
| 2012/0233668 | A1 | 9/2012 | Leafe et al. |
| 2012/0239725 | A1 | 9/2012 | Hartrick et al. |
| 2012/0246129 | A1 | 9/2012 | Rothschild et al. |
| 2012/0246257 | A1 | 9/2012 | Brown |
| 2012/0254961 | A1 | 10/2012 | Kim et al. |
| 2012/0257628 | A1 | 10/2012 | Bu et al. |
| 2012/0259954 | A1 | 10/2012 | McCarthy et al. |
| 2012/0272224 | A1 | 10/2012 | Brackman |
| 2012/0278229 | A1 | 11/2012 | Vishwanathan et al. |
| 2012/0278831 | A1 | 11/2012 | van Coppenolle et al. |
| 2012/0278833 | A1 | 11/2012 | Tam |
| 2012/0297009 | A1 | 11/2012 | Amir et al. |
| 2012/0303785 | A1 | 11/2012 | Sivasubramanian et al. |
| 2012/0303804 | A1 | 11/2012 | Sundaram et al. |
| 2012/0311648 | A1 | 12/2012 | Swildens et al. |
| 2012/0317573 | A1 | 12/2012 | Osogami et al. |
| 2012/0324089 | A1 | 12/2012 | Joshi |
| 2013/0003547 | A1 | 1/2013 | Motwani et al. |
| 2013/0003735 | A1 | 1/2013 | Chao et al. |
| 2013/0007100 | A1 | 1/2013 | Trahan et al. |
| 2013/0007101 | A1 | 1/2013 | Trahan et al. |
| 2013/0007102 | A1 | 1/2013 | Trahan et al. |
| 2013/0007241 | A1 | 1/2013 | Trahan et al. |
| 2013/0007273 | A1 | 1/2013 | Baumback et al. |
| 2013/0018945 | A1 | 1/2013 | Vendrow et al. |
| 2013/0019311 | A1 | 1/2013 | Swildens et al. |
| 2013/0034099 | A1 | 2/2013 | Hikichi et al. |
| 2013/0036307 | A1 | 2/2013 | Gagliano et al. |
| 2013/0041872 | A1 | 2/2013 | Aizman et al. |
| 2013/0042328 | A1 | 2/2013 | Padinjareveetil |
| 2013/0046869 | A1 | 2/2013 | Jenkins et al. |
| 2013/0046883 | A1 | 2/2013 | Lientz et al. |
| 2013/0054675 | A1 | 2/2013 | Jenkins et al. |
| 2013/0055374 | A1 | 2/2013 | Kustarz et al. |
| 2013/0061306 | A1 | 3/2013 | Sinn |
| 2013/0067530 | A1 | 3/2013 | Spektor et al. |
| 2013/0073808 | A1 | 3/2013 | Puthalath et al. |
| 2013/0080420 | A1 | 3/2013 | Taylor et al. |
| 2013/0080421 | A1 | 3/2013 | Taylor et al. |
| 2013/0080576 | A1 | 3/2013 | Taylor et al. |
| 2013/0080577 | A1 | 3/2013 | Taylor et al. |
| 2013/0080623 | A1 | 3/2013 | Thireault |
| 2013/0080627 | A1 | 3/2013 | Kukreja et al. |
| 2013/0080636 | A1 | 3/2013 | Friedman et al. |
| 2013/0086001 | A1 | 4/2013 | Bhogal et al. |
| 2013/0089005 | A1 | 4/2013 | Li et al. |
| 2013/0111035 | A1 | 5/2013 | Alapati et al. |
| 2013/0117282 | A1 | 5/2013 | Mugali, Jr. et al. |
| 2013/0117849 | A1 | 5/2013 | Golshan et al. |
| 2013/0130221 | A1 | 5/2013 | Kortemeyer et al. |
| 2013/0133057 | A1 | 5/2013 | Yoon et al. |
| 2013/0151646 | A1 | 6/2013 | Chidambaram et al. |
| 2013/0191499 | A1 | 7/2013 | Ludin et al. |
| 2013/0198341 | A1 | 8/2013 | Kim |
| 2013/0212300 | A1 | 8/2013 | Eggleston et al. |
| 2013/0219020 | A1 | 8/2013 | McCarthy et al. |
| 2013/0227165 | A1 | 8/2013 | Liu |
| 2013/0246567 | A1 | 9/2013 | Green et al. |
| 2013/0254269 | A1 | 9/2013 | Sivasubramanian et al. |
| 2013/0254879 | A1 | 9/2013 | Chesla et al. |
| 2013/0263256 | A1 | 10/2013 | Dickinson et al. |
| 2013/0268616 | A1 | 10/2013 | Sakata et al. |
| 2013/0275549 | A1 | 10/2013 | Field et al. |
| 2013/0279335 | A1 | 10/2013 | Ahmadi |
| 2013/0283266 | A1 | 10/2013 | Baset et al. |
| 2013/0305046 | A1 | 11/2013 | Mankovski et al. |
| 2013/0305083 | A1 | 11/2013 | Machida |
| 2013/0311583 | A1 | 11/2013 | Humphreys et al. |
| 2013/0311605 | A1 | 11/2013 | Richardson et al. |
| 2013/0311989 | A1 | 11/2013 | Ota et al. |
| 2013/0339429 | A1 | 12/2013 | Richardson et al. |
| 2013/0346465 | A1 | 12/2013 | Maltz et al. |
| 2013/0346470 | A1 | 12/2013 | Obstfeld et al. |
| 2013/0346567 | A1 | 12/2013 | Richardson et al. |
| 2013/0346614 | A1 | 12/2013 | Baughman et al. |
| 2014/0006465 | A1 | 1/2014 | Davis et al. |
| 2014/0006577 | A1 | 1/2014 | Joe et al. |
| 2014/0007239 | A1 | 1/2014 | Sharpe et al. |
| 2014/0013403 | A1 | 1/2014 | Shuster |
| 2014/0019605 | A1 | 1/2014 | Boberg |
| 2014/0022951 | A1 | 1/2014 | Lemieux |
| 2014/0036675 | A1 | 2/2014 | Wang et al. |
| 2014/0040478 | A1 | 2/2014 | Hsu et al. |
| 2014/0047104 | A1 | 2/2014 | Rodriguez |
| 2014/0053022 | A1 | 2/2014 | Forgette et al. |
| 2014/0059198 | A1 | 2/2014 | Richardson et al. |
| 2014/0059208 | A1 | 2/2014 | Yan et al. |
| 2014/0059379 | A1 | 2/2014 | Ren et al. |
| 2014/0082165 | A1 | 3/2014 | Marr et al. |
| 2014/0082614 | A1 | 3/2014 | Klein et al. |
| 2014/0089917 | A1 | 3/2014 | Attalla et al. |
| 2014/0108474 | A1 | 4/2014 | David et al. |
| 2014/0108672 | A1 | 4/2014 | Ou et al. |
| 2014/0119194 | A1 | 5/2014 | Raciborski et al. |
| 2014/0122698 | A1 | 5/2014 | Batrouni et al. |
| 2014/0122725 | A1 | 5/2014 | Batrouni et al. |
| 2014/0137111 | A1 | 5/2014 | Dees et al. |
| 2014/0143305 | A1 | 5/2014 | Choi et al. |
| 2014/0149601 | A1 | 5/2014 | Carney et al. |
| 2014/0164817 | A1 | 6/2014 | Bartholomy et al. |
| 2014/0165061 | A1 | 6/2014 | Greene et al. |
| 2014/0181268 | A1 | 6/2014 | Stevens et al. |
| 2014/0195686 | A1 | 7/2014 | Yeager et al. |
| 2014/0200036 | A1 | 7/2014 | Egner et al. |
| 2014/0215019 | A1 | 7/2014 | Ahrens |
| 2014/0244937 | A1 | 8/2014 | Bloomstein et al. |
| 2014/0258523 | A1 | 9/2014 | Kazerani et al. |
| 2014/0269371 | A1 | 9/2014 | Badea et al. |
| 2014/0279852 | A1 | 9/2014 | Chen |
| 2014/0280606 | A1 | 9/2014 | Long |
| 2014/0280679 | A1 | 9/2014 | Dey et al. |
| 2014/0297866 | A1 | 10/2014 | Ennaji et al. |
| 2014/0297870 | A1 | 10/2014 | Eggleston et al. |
| 2014/0298021 | A1 | 10/2014 | Kwon et al. |
| 2014/0310402 | A1 | 10/2014 | Giaretta et al. |
| 2014/0310811 | A1 | 10/2014 | Hentunen |
| 2014/0325155 | A1 | 10/2014 | Marshall et al. |

(56) References Cited

U.S. PATENT DOCUMENTS

2014/0331328 A1 11/2014 Wang et al.
2014/0337472 A1 11/2014 Newton et al.
2014/0351413 A1 11/2014 Smith et al.
2014/0351871 A1 11/2014 Bomfim et al.
2015/0006615 A1 1/2015 Wainner et al.
2015/0019686 A1 1/2015 Backholm
2015/0026407 A1 1/2015 Mclellan et al.
2015/0067171 A1 3/2015 Yum
2015/0074228 A1 3/2015 Drake
2015/0081877 A1 3/2015 Sethi et al.
2015/0088586 A1 3/2015 Pavlas et al.
2015/0088964 A1 3/2015 Shiell et al.
2015/0088972 A1 3/2015 Brand et al.
2015/0089621 A1 3/2015 Khalid
2015/0095516 A1 3/2015 Bergman
2015/0106864 A1 4/2015 Li et al.
2015/0154051 A1 6/2015 Kruglick
2015/0156279 A1 6/2015 Vaswani et al.
2015/0172414 A1 6/2015 Richardson et al.
2015/0188734 A1 7/2015 Petrov
2015/0189042 A1 7/2015 Sun et al.
2015/0195244 A1 7/2015 Richardson et al.
2015/0200991 A1 7/2015 Kwon
2015/0215388 A1 7/2015 Kontothanassis et al.
2015/0215656 A1 7/2015 Pulung et al.
2015/0242397 A1 8/2015 Zhuang
2015/0244580 A1 8/2015 Saavedra
2015/0256647 A1 9/2015 Richardson et al.
2015/0271031 A1 9/2015 Beevers
2015/0288647 A1 10/2015 Chhabra et al.
2015/0317118 A1 11/2015 Orikasa et al.
2015/0319260 A1 11/2015 Watson
2015/0339136 A1 11/2015 Suryanarayanan et al.
2015/0341431 A1 11/2015 Hartrick et al.
2015/0358276 A1 12/2015 Liu et al.
2015/0358436 A1 12/2015 Kim et al.
2015/0363113 A1 12/2015 Rahman et al.
2015/0363282 A1 12/2015 Rangasamy
2016/0006672 A1 1/2016 Saavedra
2016/0021197 A1 1/2016 Pogrebinsky et al.
2016/0026568 A1 1/2016 Marshall et al.
2016/0028598 A1 1/2016 Khakpour et al.
2016/0028755 A1 1/2016 Vasseur et al.
2016/0036857 A1 2/2016 Foxhoven et al.
2016/0041910 A1 2/2016 Richardson et al.
2016/0065475 A1 3/2016 Hilt et al.
2016/0065665 A1 3/2016 Richardson et al.
2016/0072669 A1 3/2016 Saavedra
2016/0072720 A1 3/2016 Richardson et al.
2016/0104346 A1 4/2016 Ovalle et al.
2016/0132600 A1 5/2016 Woodhead et al.
2016/0142251 A1 5/2016 Contreras et al.
2016/0182454 A1 6/2016 Phonsa et al.
2016/0182542 A1 6/2016 Staniford
2016/0241639 A1 8/2016 Brookins et al.
2016/0253262 A1 9/2016 Nadgowda
2016/0255042 A1 9/2016 Newton
2016/0269927 A1 9/2016 Kim et al.
2016/0274929 A1 9/2016 King
2016/0294678 A1 10/2016 Khakpour et al.
2016/0337426 A1 11/2016 Shribman et al.
2016/0366202 A1 12/2016 Phillips et al.
2016/0373789 A1 12/2016 Tsukagoshi
2017/0041428 A1 2/2017 Katsev
2017/0099254 A1 4/2017 Leach et al.
2017/0099345 A1 4/2017 Leach
2017/0109316 A1 4/2017 Hack et al.
2017/0126796 A1 5/2017 Hollis et al.
2017/0142062 A1 5/2017 Richardson et al.
2017/0153980 A1 6/2017 Araújo et al.
2017/0155678 A1 6/2017 Araújo et al.
2017/0155732 A1 6/2017 Araújo et al.
2017/0163425 A1 6/2017 Kaliski, Jr.
2017/0170973 A1 6/2017 Gill et al.
2017/0171146 A1 6/2017 Sharma et al.
2017/0180217 A1 6/2017 Puchala et al.
2017/0180267 A1 6/2017 Puchala et al.
2017/0214761 A1 7/2017 Hsu et al.
2017/0257340 A1 9/2017 Richardson et al.
2017/0374121 A1 12/2017 Phillips et al.
2018/0027040 A1 1/2018 Bae
2018/0063027 A1 3/2018 Rafferty
2018/0063193 A1 3/2018 Chandrashekhar et al.
2018/0077109 A1 3/2018 Hoeme et al.
2018/0077110 A1 3/2018 Huston, III et al.
2018/0097631 A1 4/2018 Uppal et al.
2018/0097634 A1 4/2018 Uppal et al.
2018/0097831 A1 4/2018 Uppal et al.
2018/0109553 A1 4/2018 Radlein et al.
2018/0159757 A1 6/2018 Uppal et al.
2018/0159769 A1 6/2018 Richardson et al.
2018/0167444 A1 6/2018 Sivasubramanian et al.
2018/0167469 A1 6/2018 Sivasubramanian et al.
2018/0173526 A1 6/2018 Prinsloo et al.
2018/0176615 A1 6/2018 Hannu et al.
2018/0183689 A1 6/2018 Ellsworth et al.
2018/0191817 A1 7/2018 Richardson et al.
2018/0212880 A1 7/2018 Mostert
2018/0213052 A1 7/2018 Maccarthaigh et al.
2018/0278717 A1 9/2018 Richardson et al.
2018/0287916 A1 10/2018 Mizik et al.
2018/0302322 A1 10/2018 Richardson et al.
2018/0332107 A1 11/2018 Marr et al.
2018/0351904 A1 12/2018 Mizik et al.
2018/0367498 A1 12/2018 Bliss et al.
2019/0007515 A1 1/2019 Baldwin et al.
2019/0020562 A1 1/2019 Richardson et al.
2019/0028562 A1 1/2019 Watson et al.
2019/0044787 A1 2/2019 Richardson et al.
2019/0044846 A1 2/2019 Howard et al.
2019/0073303 A1 3/2019 Marshall et al.
2019/0089818 A1 3/2019 Choi
2019/0098109 A1 3/2019 Watson
2019/0121739 A1 4/2019 Richardson et al.
2019/0129908 A1 5/2019 Kumarasamy
2019/0140922 A1 5/2019 Ellsworth et al.
2019/0173941 A1 6/2019 Puchala et al.
2019/0173972 A1 6/2019 MacCarthaigh et al.
2019/0190998 A1 6/2019 Sivasubramanian et al.
2019/0222666 A1 7/2019 Uppal et al.
2019/0268265 A1 7/2019 Richardson et al.
2019/0297137 A1 9/2019 Richardson et al.
2019/0354484 A1 11/2019 Marshall et al.

FOREIGN PATENT DOCUMENTS

CN 1422468 A 6/2003
CN 1511399 A 7/2004
CN 1605182 A 4/2005
CN 101189598 A 5/2008
CN 101431539 A 5/2009
CN 101460907 A 6/2009
CN 101631133 A 1/2010
CN 103731481 A 4/2014
EP 1603307 A2 12/2005
EP 1351141 A2 10/2007
EP 2008167 A2 12/2008
EP 3156911 A1 4/2017
JP 07-141305 6/1995
JP 2001-0506093 5/2001
JP 2001-249907 9/2001
JP 2002-024192 1/2002
JP 2002-044137 2/2002
JP 2002-323986 11/2002
JP 2003-167810 A 6/2003
JP 2003-167813 A 6/2003
JP 2003-188901 A 7/2003
JP 2003-522358 A 7/2003
JP 2004-070935 3/2004
JP 2004-532471 10/2004
JP 2004-533738 A 11/2004
JP 2005-537687 12/2005
JP 2007-133896 A 5/2007
JP 2007-207225 A 8/2007

(56) References Cited

FOREIGN PATENT DOCUMENTS

| | | | |
|---|---|---|---|
| JP | 2008-515106 | A | 5/2008 |
| JP | 2009-071538 | A | 4/2009 |
| JP | 2012-509623 | | 4/2012 |
| JP | 2012-209623 | | 10/2012 |
| WO | WO 2001/045349 | A2 | 6/2001 |
| WO | WO 2002/069608 | A2 | 9/2002 |
| WO | WO 2005/071560 | A1 | 8/2005 |
| WO | WO 2007/007960 | A1 | 1/2007 |
| WO | WO 2007/126837 | A2 | 11/2007 |
| WO | WO 2009124006 | A2 | 10/2009 |
| WO | WO 2010/002603 | A1 | 1/2010 |
| WO | WO 2012/044587 | | 4/2012 |
| WO | WO 2012065641 | A1 | 5/2012 |
| WO | WO 2014/047073 | A1 | 3/2014 |
| WO | WO 2017/106455 | A1 | 6/2017 |

OTHER PUBLICATIONS

<URL:http://web.archive.org/web/20020210124615/www.abanet.org/scitech/ec/isc/dsg-tutorial.html; pp. 1-8 (Year: 2002).*

Office Action in Application No. 09729072.0 dated Dec. 7, 2018.

Examination Report in Indian Application No. 4487/DELNP/2013 dated Dec. 28, 2018.

Office Action in European Application No. 11767118.0 dated Jan. 29, 2019.

Examination Report in Indian Application No. 3105/DELNP/2013, dated Feb. 19, 2019.

"Non-Final Office Action dated Jan. 3, 2012," U.S. Appl. No. 12/652,541, filed Jan. 3, 2012; 35 pages.

"Final Office Action dated Sep. 5, 2012," U.S. Appl. No. 12/652,541, filed Sep. 5, 2012; 40 pages.

"Notice of Allowance dated Jan. 4, 2013," U.S. Appl. No. 12/652,541, filed Jan. 4, 2013; 11 pages.

"Non-Final Office Action dated Apr. 30, 2014," U.S. Appl. No. 13/842,970; 20 pages.

"Final Office Action dated Aug. 19, 2014," U.S. Appl. No. 13/842,970; 13 pages.

"Notice of Allowance dated Dec. 5, 2014," U.S. Appl. No. 13/842,970; 6 pages.

Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].

"Content delivery network", Wikipedia, the free encyclopedia, Retrieved from the Internet: URL:http://en.wikipedia.org/w/index.php?title=Contentdelivery network&oldid=601009970, XP055153445, Mar. 24, 2008.

"Global Server Load Balancing with ServerIron," Foundry Networks, retrieved Aug. 30, 2007, from http://www.foundrynet.com/pdf/an-global-server-load-bal.pdf, 7 pages.

"Grid Computing Solutions," Sun Microsystems, Inc., retrieved May 3, 2006, from http://www.sun.com/software/grid, 3 pages.

"Grid Offerings," Java.net, retrieved May 3, 2006, from http://wiki.java.net/bin/view/Sungrid/OtherGridOfferings, 8 pages.

"Recent Advances Boost System Virtualization," eWeek.com, retrieved from May 3, 2006, http://www.eWeek.com/article2/0,1895,1772626,00.asp, 5 pages.

"Scaleable Trust of Next Generation Management (STRONGMAN)," retrieved May 17, 2006, from http://www.cis.upenn.edu/~dsl/STRONGMAN/, 4 pages.

"Sun EDA Compute Ranch," Sun Microsystems, Inc., retrieved May 3, 2006, from http://sun.com/processors/ranch/brochure.pdf, 2 pages.

"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3 .xml, 2 pages.

"Sun N1 Grid Engine 6," Sun Microsystems, Inc., retrieved May 3, 2006, from http://www.sun.com/software/gridware/index.xml, 3 pages.

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Softricity Desktop," Softricity, Inc., retrieved May 3, 2006, from http://www.softricity.com/products/, 3 pages.

"Xen—The Xen virtual Machine Monitor," University of Cambridge Computer Laboratory, retrieved Nov. 8, 2005, from http://www.cl.cam.ac.uk/Research/SRG/netos/xen/, 2 pages.

"XenFaq," retrieved Nov. 8, 2005, from http://wiki.xensource.com/xenwiki/XenFaq?action=print, 9 pages.

Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.

American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.

Arends et al., DNS Security Introduction and Requirements, RFC 4033, Mar. 2005, 21 pages.

Ariyapperuma et al., "Security Vulnerabilities in DNS and DNS-SEC." The Second International Conference on Availability, Reliability and Security, IEEE, 2007, 8 pages.

Armour et al.: "A Heuristic Algorithm and Simulation Approach to Relative Location of Facilities"; Management Science, vol. 9, No. 2 (Jan. 1963); pp. 294-309.

Baglioni et al., "Preprocessing and Mining Web Log Data for Web Personalization", LNAI 2829, 2003, pp. 237-249.

Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).

Bellovin, S., "Distributed Firewalls," ;login;:37-39, Nov. 1999, http://www.cs.columbia.edu/-smb/papers/distfw. html, 10 pages, retrieved Nov. 11, 2005.

Blaze, M., "Using the KeyNote Trust Management System," Mar. 1, 2001, from http://www.crypto.com/trustmgt/kn.html, 4 pages, retrieved May 17, 2006.

Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.

Byun et al., "A Dynamic Grid Services Deployment Mechanism for On-Demand Resource Provisioning", IEEE International Symposium on Cluster Computing and the Grid:863-870, 2005.

Chandramouli et al., "Challenges in Securing the Domain Name System." IEEE Security & Privacy4.1 (2006),pp. 84-87.

Chipara et al, "Realtime Power-Aware Routing in Sensor Network", IEEE, 2006, 10 pages.

Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.

Cohen et al., "Proactive Caching of DNS Records: Addressing a Performance Bottleneck", Proceedings of Saint 2001 Symposium on Applications and the Internet; 8-12, Jan. 8, 2001, IEEE Computer Society, pp. 85-94.

Coulson, D., "Network Security Iptables," Apr. 2003, Linuxpro, Part 2, retrieved from http://davidcoulson.net/writing/lxf/38/iptables.pdf, 4 pages.

Coulson, D., "Network Security Iptables," Mar. 2003, Linuxpro, Part 1, retrieved from http://davidcoulson.net/writing/lxf/39/iptables.pdf, 4 pages.

Deleuze, C., et al., A DNS Based Mapping Peering System for Peering CDNs, draft-deleuze-cdnp-dnsmap-peer-00.txt, Nov. 20, 2000, 20 pages.

Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.

(56) References Cited

OTHER PUBLICATIONS

Eastlake, Donald, Domain Name System Security Extensions, RFC 2535, Mar. 1999, 47 pages.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes",May 2005, In Proc. Of Networking 2005, all pages.
Gunther et al, "Measuring Round Trip Times to determine the Distance between WLAN Nodes", Dec. 18, 2004, Technical University Berlin, all pages.
Guo, F. Understanding Memory Resource Management in Vmware vSphere 5.0, Vmware, 2011, pp. 1-29.
Hameed, CC, "Disk Fragmentation and System Performance", Mar. 14, 2008, 3 pages.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Horvath et al., "Enhancing Energy Efficiency in Multi-tier Web Server Clusters via Prioritization," in Parallel and Distributed Processing Symposium, 2007. IPDPS 2007. IEEE International , vol., No., pp. 1-6, Mar. 26-30, 2007.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
JH Software, Moving a DNS Server to a New IP Address, last updated Jan. 26, 2006, 1 page.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.
Kenshi, P., "Help File Library: Iptables Basics," Justlinux, retrieved Dec. 1, 2005, from http://www.justlinux.com/nhf/Security/Iptables _ Basics.html, 4 pages.
Krsul et al., "VMPlants: Providing and Managing Virtual Machine Execution Environments for Grid Computing", Nov. 6, 2004 (Nov. 6, 2004), Supercomputing, 2004. Proceedings of the ACM/IEEE SC2004 Conference Pittsburgh, PA, USA Nov. 6-12, 2004, Piscataway, NJ, USA, IEEE, 1730 Massachusetts Ave., NW Washington, DC 20036-1992 USA, 12 pages.
Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Sharif et al, "Secure In-VM Monitoring Using Hardware Virtualization", Microsoft, Oct. 2009 http://research.microsoft.com/pubs/153179/sim-ccs09.pdf; 11 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.
Zhao et al., "Distributed file system support for virtual machines in grid computing", Jun. 4, 2004 (Jun. 4, 2004), High Performance Distributed Computing, 2004. Proceedings. 13th IEEE International Symposium on Honolulu, HI, USA Jun. 4-6, 2004, Piscataway, NJ, USA, IEEE, p. 202-211.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Supplementary European Search Report in Application No. 09729072.0 2266064 dated Dec. 10, 2014.
Office Action in Application No. 09729072.0 dated May 14, 2018.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, dated Oct. 12, 2011 in 11 pages.
Supplementary European Search Report in Application No. 09727694.3 dated Jan. 30, 2012 in 6 pages.
Singapore Examination Report in Application No. 201006837-7 dated Mar. 16, 2012.
First Office Action in Chinese Application No. 200980111426.1 dated Feb. 16, 2013.

(56) References Cited

OTHER PUBLICATIONS

Second Office Action in Chinese Application No. 200980111426.1 dated Dec. 25, 2013.
Third Office Action in Chinese Application No. 200980111426.1 dated Jul. 7, 2014.
Fourth Office Action in Chinese Application No. 200980111426.1 dated Jan. 15, 2015.
Fifth Office Action in Chinese Application No. 200980111426.1 dated Aug. 14, 2015.
First Office Action in Japanese Application No. 2011-502139 dated Nov. 5, 2013.
Decision of Rejection in Application No. 2011-502139 dated Jun. 30, 2014.
Office Action in Japanese Application No. 2011-502139 dated Aug. 17, 2015.
Office Action in Indian Application No. 5937/CHENP/2010 dated Jan. 19, 2018.
Singapore Written Opinion in Application No. 201006874-0, dated Oct. 12, 2011 in 10 pages.
First Office Action in Japanese Application No. 2011-502140 dated Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Search Report in European Application No. 09839809.2 dated May 11, 2015.
Office Action in European Application No. 09839809.2 dated Dec. 8, 2016.
Office Action in Indian Application No. 6210/CHENP/2010 dated Mar. 27, 2018.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
Supplementary European Search Report in Application No. 09728756.9 dated Jan. 8, 2013.
First Office Action in Japanese Application No. 2011-503091 dated Nov. 18, 2013.
Office Action in Japanese Application No. 2014-225580 dated Oct. 26, 2015.
Office Action in Japanese Application No. 2014-225580 dated Oct. 3, 2016.
Search Report and Written Opinion issued in Singapore Application No. 201006873-2 dated Oct. 12, 2011.
Examination Report in Indian Application No. 6213/CHENP/2010 dated May 23, 2018.
First Office Action is Chinese Application No. 200980125551.8 dated Jul. 4, 2012.
First Office Action in Japanese Application No. 2011-516466 dated Mar. 6, 2013.
Second Office Action in Japanese Application No. 2011-516466 dated Mar. 17, 2014.
Decision of Refusal in Japanese Application No. 2011-516466 dated Jan. 16, 2015.
Office Action in Japanese Application No. 2011-516466 dated May 30, 2016.
Office Action in Canadian Application No. 2726915 dated May 13, 2013.
First Office Action in Korean Application No. 10-2011-7002461 dated May 29, 2013.
First Office Action in Chinese Application No. 200980145872.4 dated Nov. 29, 2012.
First Office Action in Canadian Application No. 2741895 dated Feb. 25, 2013.
Second Office Action in Canadian Application No. 2741895 dated Oct. 21, 2013.
Partial Supplementary Search Report in European Application No. 09826977.2 dated Oct. 4, 2016.
Search Report and Written Opinion in Singapore Application No. 201103333-9 dated Nov. 19, 2012.
Examination Report in Singapore Application No. 201103333-9 dated Aug. 13, 2013.
Office Action in Chinese Application No. 201310717573.1 dated Jul. 29, 2016.
Office Action in European Application No. 11767118.0 dated Feb. 3, 2017.
Office Action in European Application No. 11767118.0 dated Jul. 25, 2018.
International Search Report and Written Opinion in PCT/US2011/053302 dated Nov. 28, 2011 in 11 pages.
International Preliminary Report on Patentability in PCT/US2011/053302 dated Apr. 2, 2013.
First Office Action in Japanese Application No. 2013-529454 dated Feb. 3, 2014 in 6 pages.
Office Action in Japanese Application No. 2013-529454 dated Mar. 9, 2015 in 8 pages.
First Office Action issued in Australian Application No. 2011307319 dated Mar. 6, 2014 in 5 pages.
Search Report and Written Opinion in Singapore Application No. 201301573-0 dated Jul. 1, 2014.
First Office Action in Chinese Application No. 201180046104.0 dated Nov. 3, 2014.
Second Office Action in Chinese Application No. 201180046104.0 dated Sep. 29, 2015.
Third Office Action in Chinese Application No. 201180046104.0 dated Apr. 14, 2016.
Decision of Rejection in Chinese Application No. 201180046104.0 dated Oct. 17, 2016.
Examination Report in Singapore Application No. 201301573-0 dated Dec. 22, 2014.
International Preliminary Report on Patentability in PCT/US2011/061486 dated May 22, 2013.
International Search Report and Written Opinion in PCT/US2011/061486 dated Mar. 30, 2012 in 11 pages.
Office Action in Canadian Application No. 2816612 dated Nov. 3, 2015.
Office Action in Canadian Application No. 2816612 dated Oct. 7, 2016.
Office Action in Canadian Application No. 2816612 dated Aug. 8, 2017.
First Office Action in Chinese Application No. 201180053405.6 dated Feb. 10, 2015.
Second Office Action in Chinese Application No. 201180053405.6 dated Dec. 4, 2015.
Office Action in Japanese Application No. 2013-540982 dated Jun. 2, 2014.
Written Opinion in Singapore Application No. 201303521-7 dated May 20, 2014.
Extended Search Report in European Application No. 18156163 dated Sep. 3, 2018.
Office Action in Japanese Application No. 2015-533132 dated Apr. 25, 2016.
Office Action in Canadian Application No. 2884796 dated Apr. 28, 2016.
Office Action in Russian Application No. 2015114568 dated May 16, 2016.
Supplementary Examination Report in Singapore Application No. 11201501987U dated May 17, 2017.
Office Action in Chinese Application No. 2013800492635 dated Aug. 30, 2017.
International Search Report and Written Opinion in PCT/US07/07601 dated Jul. 18, 2008 in 11 pages.
International Preliminary Report on Patentability in PCT/US2007/007601 dated Sep. 30, 2008 in 8 pages.
Supplementary European Search Report in Application No. 07754164.7 dated Dec. 20, 2010 in 7 pages.

(56) References Cited

OTHER PUBLICATIONS

Office Action in Chinese Application No. 200780020255.2 dated Mar. 4, 2013.
Office Action in Chinese Application No. 201310537815.9 dated Feb. 1, 2018.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 4 pages.
Office Action in Japanese Application No. 2015-075644 dated Apr. 5, 2016.
Office Action in European Application No. 07754164.7 dated Dec. 14, 2015.
Office Action in European Application No. 07754164.7 dated Jan. 25, 2018.
Office Action in Chinese Application No. 201310537815.9 dated Jul. 5, 2016.
Office Action in Chinese Application No. 201310537815.9 dated Jun. 2, 2017.
International Search Report and Written Opinion in PCT/US/2016/066848 dated May 1, 2017.
International Preliminary Report on Patentability in PCT/US/2016/066848 dated Jun. 19, 2018.
International Search Report and Written Opinion in PCT/US2017/055156 dated Dec. 13, 2017.
International Preliminary Report on Patentability and Written Opinion in PCT/US2017/055156 dated Apr. 9, 2019.
Office Action in European Application No. 13770602.4 dated Mar. 11, 2019.
"Zaman et al., ""Combinatorial Auction-Based Dynamic VM Provisioning and Allocation in Clouds"", Department of Computer Science, Wayne State University, Sep. 2011 http://www.cs.wayne.edu/-dgrosu/pub/ccgrid12-symp.pdf."
Extended European Search Report in Application No. 16876655.8 dated Aug. 20, 2019.
Frangoudis et al., "PTPv2-based network load estimation and its application to QoE monitoring for Over-the-Top services", IEEE, The 5th International conference on Information, Intelligence, Systems and Applications, IISA 2014, XP032629858, Jul. 7, 2014, pp. 176-181.
Partial Search Report in European Application No. 16876655.8 dated May 15, 2019.
International Search Report and Written Opinion in PCT/US2018/036634 dated Sep. 11, 2018.
Extended Search Report in European Applicaton No. 19184826.6 dated Jan. 17, 2020.
International Preliminary Report on Patentability and Written Opinion in PCT/US2018/036634 dated Dec. 24, 2019.
Office Action in Indian Application No. 2823/DELNP/2015 dated Oct. 25, 2019.

* cited by examiner

MANAGING SECURE CONTENT IN A CONTENT DELIVERY NETWORK

CROSS-REFERENCE TO RELATED APPLICATION

This application is a continuation of U.S. patent application Ser. No. 15/597,841, now U.S. Pat. No. 10,135,620, entitled MANAGING SECURE CONTENT IN A CONTENT DELIVERY NETWORK and filed May 17, 2017, which in turn is a continuation of U.S. patent application Ser. No. 14/800,591, now U.S. Pat. No. 9,712,325, entitled MANAGING SECURE CONTENT IN A CONTENT DELIVERY NETWORK and filed Jul. 15, 2015, which is a continuation of U.S. application Ser. No. 13/794,415, now U.S. Pat. No. 9,130,756, entitled MANAGING SECURE CONTENT IN A CONTENT DELIVERY NETWORK and filed Mar. 11, 2013, which is a continuation of U.S. application Ser. No. 12/722,454, now U.S. Pat. No. 8,397,073, entitled MANAGING SECURE CONTENT IN A CONTENT DELIVERY NETWORK and filed Mar. 11, 2010, which in turn claims the benefit of U.S. Provisional Application No. 61/240,164, entitled DELIVERY OF SECURE CONTENT and filed on Sep. 4, 2009, the disclosures of which are incorporated herein by reference.

BACKGROUND

Generally described, computing devices and communication networks can be utilized to exchange information. In a common application, a computing device can request content from another computing device via the communication network. For example, a user at a personal computing device can utilize a software browser application to request content, such as a Web page, from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices. Such higher volume requests can place a strain on the content provider's computing resources utilized to provide the requested content. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider(s) (or any service provider on behalf of the content provider(s)) would provide client computing devices data associated with the Web page and/or the data associated with the embedded resources.

Some content providers attempt to facilitate the delivery of requested content, such as Web pages and/or resources identified in Web pages, through the utilization of a network storage provider or a content delivery network ("CDN") service provider. A network storage provider and a CDN server provider each typically maintain a number of computing devices in a communication network that can maintain content from various content providers. In turn, content providers can instruct, or otherwise suggest to, client computing devices to request some, or all, of the content provider's content from the network storage provider's or CDN service provider's computing devices.

As with content providers, network storage providers and CDN service providers are also generally motivated to provide requested content to client computing devices often with consideration of efficient transmission of the requested content to the client computing device and/or consideration of a cost associated with the transmission of the content. Accordingly, the service providers often consider factors such as latency of delivery of requested content in order to meet service level agreements or to generally improve the quality of delivery service.

With reference to the previous illustrative example, in some implementations, the content provider may desire to designate at least some of the additional resource embedded in the requested Web page as restricted content or to otherwise keep some portion of the content secure. In one approach, the content provider can utilize functionality included in the communication protocols, such as the Referer header associated with hypertext transfer protocol ("HTTP"), to restrict which clients can request content from a CDN service provider. However, such approaches are typically considered as a weak form of authentication and are prone to be spoofed. In another approach, the content provider can specify for the utilization of shared secret keys between the content provider and the CDN service provider or otherwise require the CDN service provider to authenticate all client requests for content with the content provider. However, such approaches typically require additional infrastructure and resources from the content provider and CDN service provider regarding authorization or verification protocols for each secure content request by a client.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure is directed to delivery of one or more resources associated with a content provider by selecting from available storage service providers and content delivery network ("CDN") service providers. Specifically, aspects of the disclosure will be described with regard to the management of secure resource delivery by a service provider on behalf of a content provider. In one aspect, a content provider may associate different identities to the CDN service providers utilized to distribute requested resources on behalf of the content provider. The content provider, directly or indirectly, can associate content distribution policies in accordance with each CDN service provider identity. In another aspect, the client computing devices and CDN service providers can utilize secure content signatures in content requests without requiring validation of each signed content request by the content provider. Although various aspects of the disclosure will be described with regard to illustrative examples and embodiments, one skilled in the art will appreciate that the disclosed embodiments and examples should not be construed as limiting.

Figure 1:
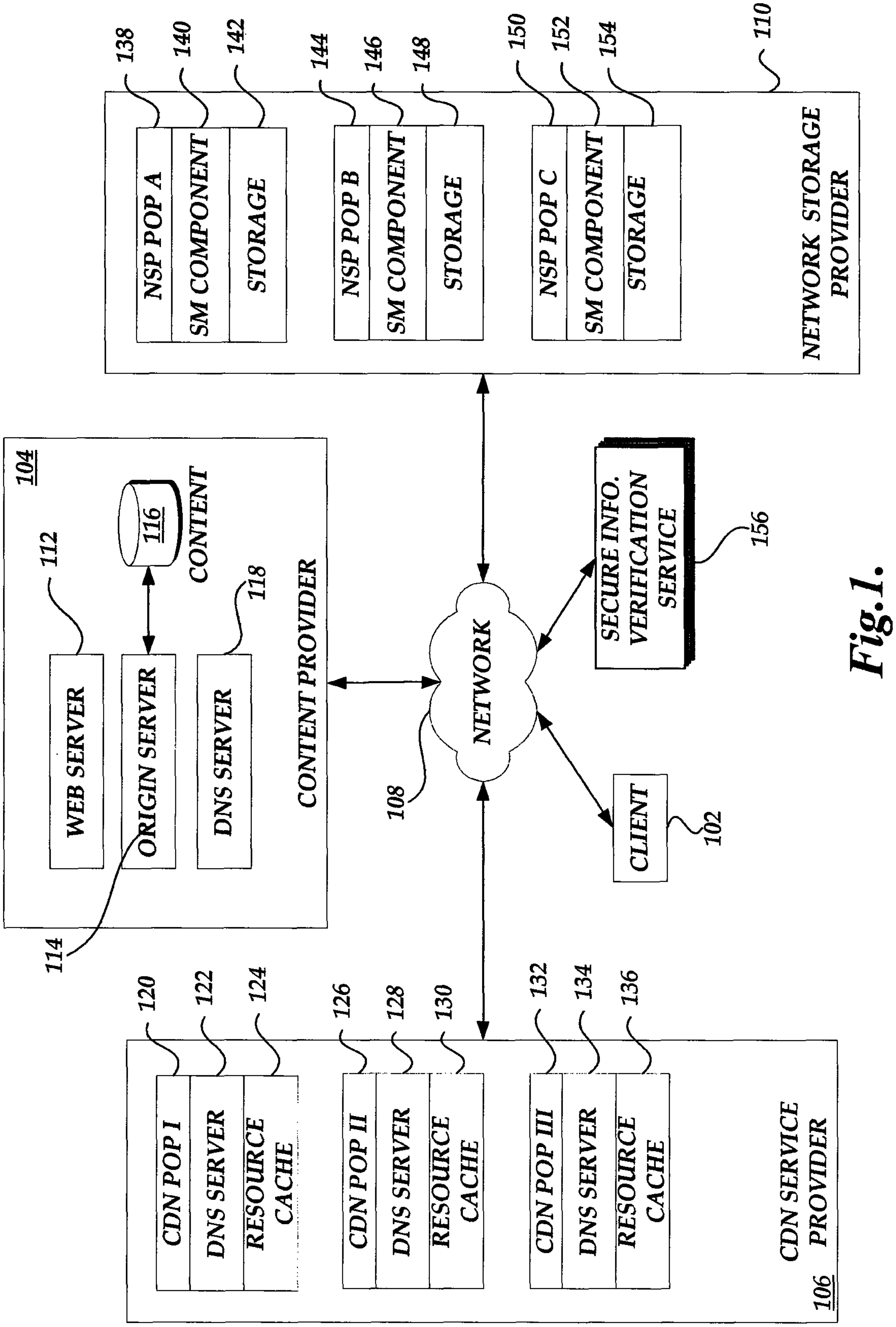
FIG. 1 is a block diagram illustrative of content delivery environment including a number of client computing devices, content provider, a network storage provider, and a content delivery network service provider.

FIG. 1 is a block diagram illustrative of content delivery environment 100 for the managing registration of content with a CDN service provider and subsequent processing of content requests. As illustrated in FIG. 1, the content delivery environment 100 includes a number of client computing devices 102 (generally referred to as clients) for requesting content from a content provider, a network storage provider 110, and/or a CDN service provider 106. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS nameserver, that generates the DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 112 corresponding to one or more server computing devices for obtaining and processing requests for content (such as Web pages) from the client computing devices 102. The content provider 104 can further include an origin server component 114 and associated storage component 116 corresponding to one or more computing devices for obtaining and processing requests for network resources. One skilled in the relevant art will appreciate that the content provider 104 can be associated with various additional computing resources, such additional computing devices for administration of content and resources, DNS nameservers, and the like. For example, as further illustrated in FIG. 1, the content provider 104 can be associated with one or more DNS nameserver components 118 that would receive DNS queries associated with the domain of the content provider 104 and be authoritative to resolve client computing device DNS queries corresponding to a domain of the content provider 104 (e.g., return an IP address responsive to the DNS query). A DNS nameserver component is considered to be authoritative to a DNS query if the DNS nameserver can completely resolve the query by providing a responsive IP address. Additionally, the content provider 104 may include multiple components or eliminate some components altogether, such as origin server 114.

With continued reference to FIG. 1, the content delivery environment 100 can further include a CDN service provider 106 in communication with the one or more client computing devices 102, the content provider 104, and the network storage provider 110 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 120, 126, 132 that correspond to nodes on the communication network 108. Each POP 120, 126, 132 includes a DNS component 122, 128, 134 made up of a number of DNS nameserver computing devices for resolving DNS queries from the client computers 102. Each POP 120, 126, 132 also includes a resource cache component 124, 130, 136 made up of a number of cache server computing devices for storing resources from content providers or network storage providers and transmitting various requested resources to various client computers. The DNS components 122, 128, 134 and the resource cache components 124, 130, 136 may further include additional software and/or hardware components that facilitate communications including, but not limited, load balancing or load sharing software/hardware components.

In an illustrative embodiment, the DNS component 122, 128, 134 and resource cache component 124, 130, 136 are considered to be logically grouped, regardless of whether the components, or portions of the components, are physically separate. Additionally, although the POPs 120, 126, 132 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

With further continued reference to FIG. 1, the content delivery environment 100 can also include a network storage provider 110 in communication with the one or more client computing devices 102, the CDN service provider 106, and the content provider 104 via the communication network 108. The network storage provider 110 illustrated in FIG. 1 also corresponds to a logical association of one or more computing devices associated with a network storage provider. Specifically, the network storage provider 110 can include a number of network storage provider Point of Presence ("NSP POP") locations 138, 144, 150 that correspond to nodes on the communication network 108. Each NSP POP 138, 144, 150 can include a storage management ("SM") component 140, 146, 152 for obtaining requests for resources from the client computing devices 102 and determining whether the requested resource should be provided by a CDN service provider 106 or from a storage component associated with the network storage provider 110. In an illustrative embodiment, the storage management components 138, 144, 150 can be associated with one or more DNS nameserver components that are operative to receive DNS queries related to registered domain names associated with the network storage provider 110. The one or more DNS nameservers can be authoritative to resolve client computing device DNS queries corresponding to the registered domain names of the network storage provider 110. As similarly set forth above, a DNS nameserver component is considered to be authoritative to a DNS query if the DNS nameserver can resolve the query by providing a responsive IP address.

Each NSP POP 138, 144, 150 also includes a storage component 142, 148, 154 made up of a number of storage devices for storing resources from content providers which will be processed by the network storage provider 110 and transmitted to various client computers. The storage components 142, 148, 154 may further include additional software and/or hardware components that facilitate communications including, but not limited to, load balancing or load sharing software/hardware components. In an illustrative embodiment, the storage components 142, 148, 154 are considered to be logically grouped, regardless of whether the components, or portions of the components, are physically separate.

Additionally, although the NSP POPs 138, 144, 150 are illustrated in FIG. 1 as logically associated with the network storage provider 110, the NSP POPs will be geographically distributed throughout the communication network 108 in a manner to best serve various demographics of client computing devices 102. Additionally, the network storage provider 110 can be associated with various additional computing resources, such additional computing devices for administration of content and resources, additional DNS nameservers, and the like. Even further, the components of the network storage provider 110 and components of the CDN service provider 106 can be managed by the same or different entities.

In an illustrative embodiment, the content delivery environment 100 can further include one or more secure information verification services 156. The secure information verification services 156 can be used in conjunction with a secured resource request, or secured content request, to verify security information provided by the client computing devices 102 or the CDN service provider 106. The secure information verification services 156 can be associated with one or more components of the content delivery environment 100. Alternatively, the secure information verification services 156 can be an independent, third party service utilized by other components in the content delivery environment 100.

One skilled in the relevant art will appreciate that the components and configurations provided in FIG. 1 are illustrative in nature. Accordingly, additional or alternative components and/or configurations, especially regarding the additional components, systems and subsystems for facilitating communications may be utilized.

With reference now to FIGS. 2-6, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2A:
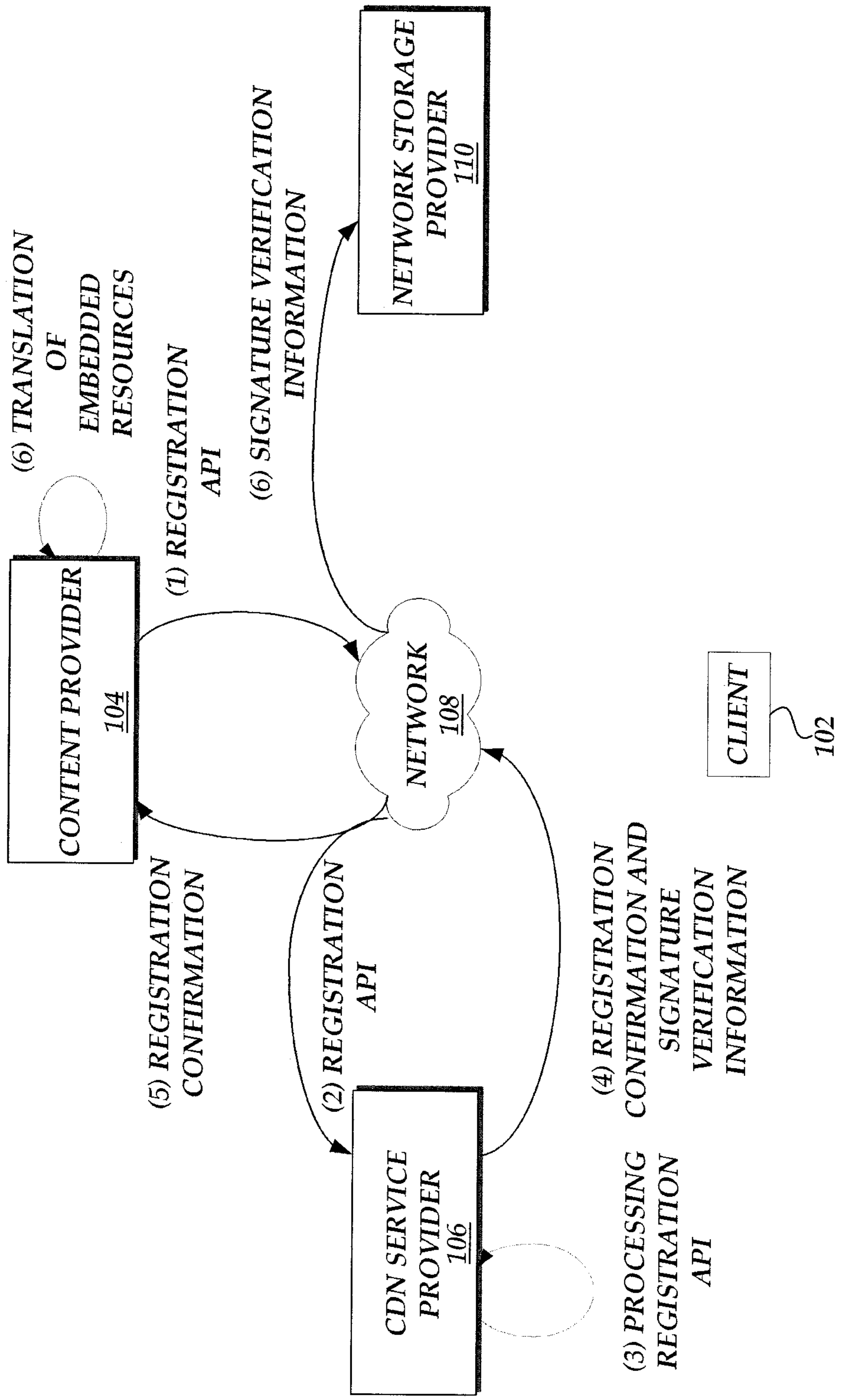
FIGS. 2A and 2B are block diagrams of the content delivery environment of FIG. 1 illustrating the registration of a content provider with a network storage provider and CDN service provider for facilitating the delivery of secure content.

With reference to FIG. 2A, an illustrative interaction for registration of a content provider 104 with the CDN service provider 106 will be described. As illustrated in FIG. 2A, the CDN service provider content registration process begins with registration of the content provider 104 with the CDN service provider 106. In an illustrative embodiment, the content provider 104 utilizes a registration application program interface ("API") to register with the CDN service provider 106 such that the CDN service provider 106 can managed content requests on behalf of the content provider 104. The registration API includes the identification of the origin server 114 of the content provider 104 that will provide requested resources to the CDN service provider 106 (either directly or via the network storage provider 110). In addition or alternatively, the registration API includes the content to be stored/managed by the CDN service provider 106 on behalf of the content provider 104.

Additionally, the registration API establishes the secured content information to be utilized by the CDN service provider 106 to manage requests by client computing devices 102. In one aspect, the secured content information can include signature information to be utilized by the CDN service provider 106 to verify secure content requests by clients. Alternatively, the secured content information can include information identifying one or more secure information verification services 156 utilized to verify secure content requests. In another aspect, the secured content information can include identity information utilized, such as an identifier, by the CDN service provider 106 to request information from an origin source, such as network storage provider 110. The identity information established for the CDN service provider 106 can be unique to individual CDN service providers or shared by two or more CDN server providers.

Based on the processing the registration API, the CDN service provider 106 can also confirm the registration API with the content provider 104. Additionally, the CDN service provider 106 can establish secure content information with network storage provider 110, which can include signature information to be utilized by the network storage provider 110 to verify secure content requests by the CDN service provider 106. The secure content information established between the CDN service provider 106 and the network storage provider 110 can be complimentary to any secure information provided by the content provider 104 or can replace any secure information provided by the content provider. Moreover, the secure content information established between the CDN service provider 106 and the network storage provider 110 can be different from any secure information associated with client computing devices 102.

Figure 2B:
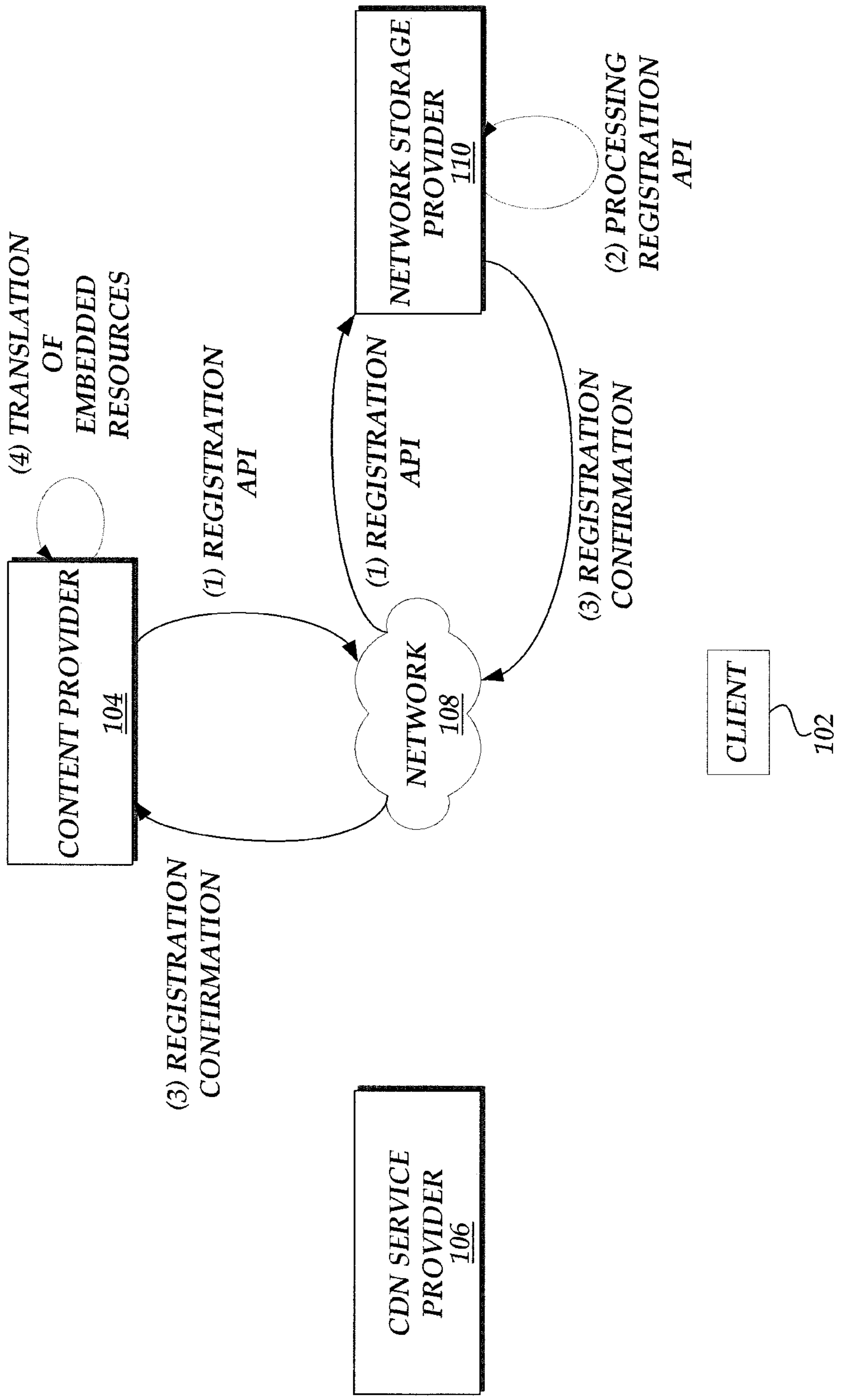

With reference to FIG. 2B, an illustrative interaction for registration of a content provider 104 with the network storage provider 110 will be described. As illustrated in FIG. 2B, the storage provider content registration process begins with registration of the content provider 104 with the network storage provider 110. In an illustrative embodiment, the content provider 104 utilizes a registration application program interface ("API") to register with the network storage provider 110 such that the network storage provider 110 can provide content on behalf of the content provider 104. The registration API includes the identification of the origin server 114 of the content provider 104 that will provide requested resources to the network storage provider 110. In addition or alternatively, the registration API includes the content to be stored by the network storage provider 110 on behalf of the content provider 104. Additionally, the registration API with the network storage provider 110 can include the establishment of policies by the content provider 104 as to content requests by different identifiers associated with one or more CDN service providers 106. Still further, the content provider 104 can designate proxy authority to make, modify, or maintain policy information. The proxy authority can be provided to the CDN service providers 106 that maintain the policy information or to additional components of the content delivery environment 100.

One skilled in the relevant art will appreciate that upon storage of the content by the network storage provider 110, the content provider 104 can begin to direct requests for content from client computing devices 102 to the CDN service providers 106 or the CDN service providers to the network storage provider 110. Specifically, in accordance with DNS routing principles, a client computing device DNS request corresponding to a resource identifier would eventually be directed toward a storage component 140, 144, 148 of a NSP POP 138, 142, 146 associated with the network storage provider 110 (e.g., resolved to an IP address corresponding to a storage component).

In an illustrative embodiment, upon receiving the registration API, the network storage provider 110 obtains and processes the content provider registration information. In an illustrative embodiment, the network storage provider 110 can then generate additional information that will be used by the client computing devices 102 as part of the content requests. The additional information can include, without limitation, content provider identifiers, such as content provider identification codes, storage provider identifiers, such as storage provider identification codes, executable code for processing resource identifiers, such as script-based instructions, and the like. One skilled in the relevant art will appreciate that various types of additional information may be generated by the network storage provider 110 and that the additional information may be embodied in any one of a variety of formats.

The network storage provider 110 returns an identification of applicable domains for the network storage provider (unless it has been previously provided) and any additional information to the content provider 104. In turn, the content provider 104 can then process the stored content with content provider specific information. In one example, the content provider 104 translates resource identifiers originally directed toward a domain of the origin server 114 to a domain corresponding to the network storage provider 110. The modified URLs are embedded into requested content in a manner such that DNS queries for the modified URLs are received by a DNS nameserver corresponding to the network storage provider 110 and not a DNS nameserver corresponding to the content provider 104.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

Figure 3:
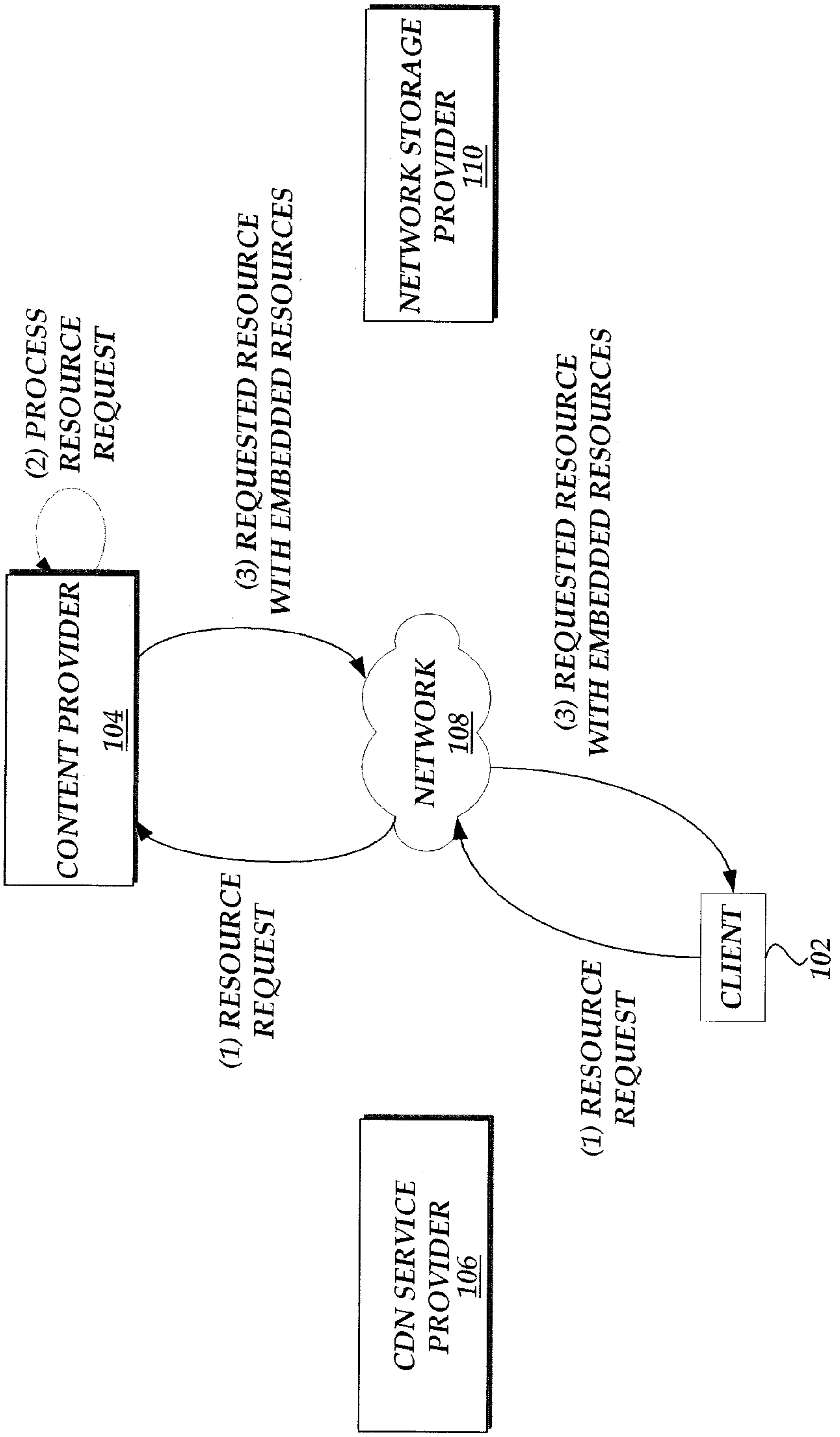
FIG. 3 is a block diagram of the content delivery environment of FIG. 1 illustrating the generation and processing of a resource request by a client computing device to a content provider.

During an illustrative translation process, the content provider URL is modified such that requests for the resources associated with the modified URLs resolve to a POP associated with the CDN service provider 106. In one embodiment, the modified URL identifies the domain of the CDN service provider (e.g., "CDNprovider.com"), the same name of the resource to be requested (e.g., "resource.xxx") and the same path where the resource will be found (e.g., "path"). Additionally, the modified URL can include additional processing information (e.g., "additional information"). Still further, in the event the requested resource is designated as secured content by the content provider 104, the content provider URL will include some type of signature information that will be utilized by the CDN service provider 106 to verify that the request for the resource has been authorized by the content provider 104 (e.g., "signature information"). The modified URL would have the form of:

http://additional information.CDNprovider.com/path/resource.xxx?signature_information In another embodiment, the information associated with the CDN service provider 106 is included in the modified URL, such as through prepending or other techniques, such that the modified URL can maintain all of the information associated with the original URL. In this embodiment, the modified URL would have the form of:

http://additional information.CDNprovider.com/www.contentprovider.com/path/resource.xxx?signature_information With reference now to FIG. 3, after completion of the registration and translation processes illustrated in FIG. 2, a client computing device 102 subsequently generates a content request that is received and processed by the content provider 104, such as through the Web server 112. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. In one embodiment, the embedded resource identifiers will generally in the form of the modified URLs, described above. Alternatively, one or more embedded resources may not correspond to secure content. Accordingly, the modified URLs associated with such non-secure content may not include the additional signature information.

Alternatively, the embedded resource identifiers can remain in the form of the content provider URLs that would be received and processed by a DNS nameserver associated with the content provider 104. In this alternative embodiment, the receiving DNS nameserver would use a canonical name record ("CNAME") that would identify the CDN service provider 106. Upon receipt of the returned CNAME, the client computing device 102 subsequently transmits a DNS query corresponding to the received CNAME. The client computing device 102 can then process the response to the received CNAME in a manner similar to the modified URLs, described below. For ease of illustration, however, the alternative embodiment will not be described in further detail and the additional processing steps will only be described with regard to the modified URL. One skilled in the relevant will appreciate that the below description may be applicable to CNAMEs as described in the alternative embodiment.

Figure 4A:
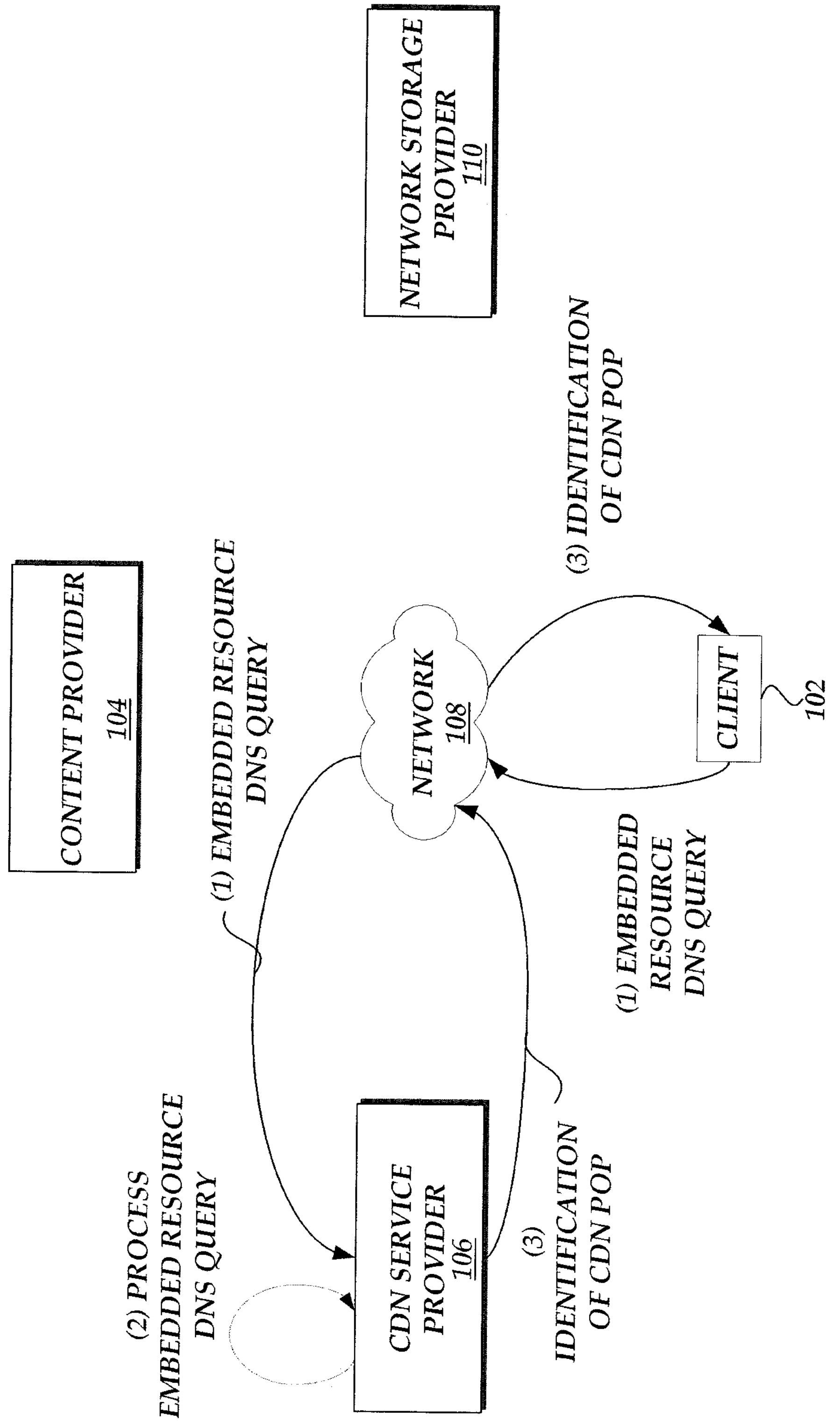
FIGS. 4A-4C are block diagrams of the content delivery environment of FIG. 1 illustrating obtaining client computing device DNS queries and having the subsequent resource request processed by a CDN service provider.

With reference now to FIG. 4A, upon receipt of the requested content, the client computing device 102, such as through a browser software application, begins processing any of the markup code included in the content and attempts to acquire the resources identified by the embedded resource identifiers (e.g., the embedded, modified URLs). Accordingly, the first step in acquiring the content correspond to the issuance, by the client computing device 102 (through its local DNS resolver), of a DNS query for the embedded, modified URL that results in the identification of a DNS nameserver authoritative to the "." and the "com" portions of the embedded, modified URL. After partially resolving the modified URL according to the "." and "com" portions of the embedded URL, the client computing device 102 then issues another DNS query for the embedded, modified URL that results in ".CDNprovider" portion of the embedded, modified URL. The issuance of DNS queries corresponding to the "." and the "com" portions of a URL, such as the modified URL, are well known and have not been illustrated.

In an illustrative embodiment, the identification of a DNS nameserver authoritative to the "CDNprovider" corresponds to an IP address of a DNS nameserver associated with the CDN service provider 106. In one embodiment, the IP address is a specific network address unique to a DNS nameserver component of a POP. In another embodiment, the IP address can be shared by one or more POPs. In this embodiment, a further DNS query to the shared IP address utilizes a one-to-many network routing schema, such as anycast, such that a specific POP will receive the request as a function of network topology. For example, in an anycast implementation, a DNS query issued by a client computing device 102 to a shared IP address will arrive at a DNS nameserver component of the CDN service provider 106 logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a CDN service provider POP. With continued reference to FIG. 4A, once one of the DNS nameservers in the CDN service provider 106 receives the request, the specific DNS nameserver attempts to resolve the request.

Figure 4B:
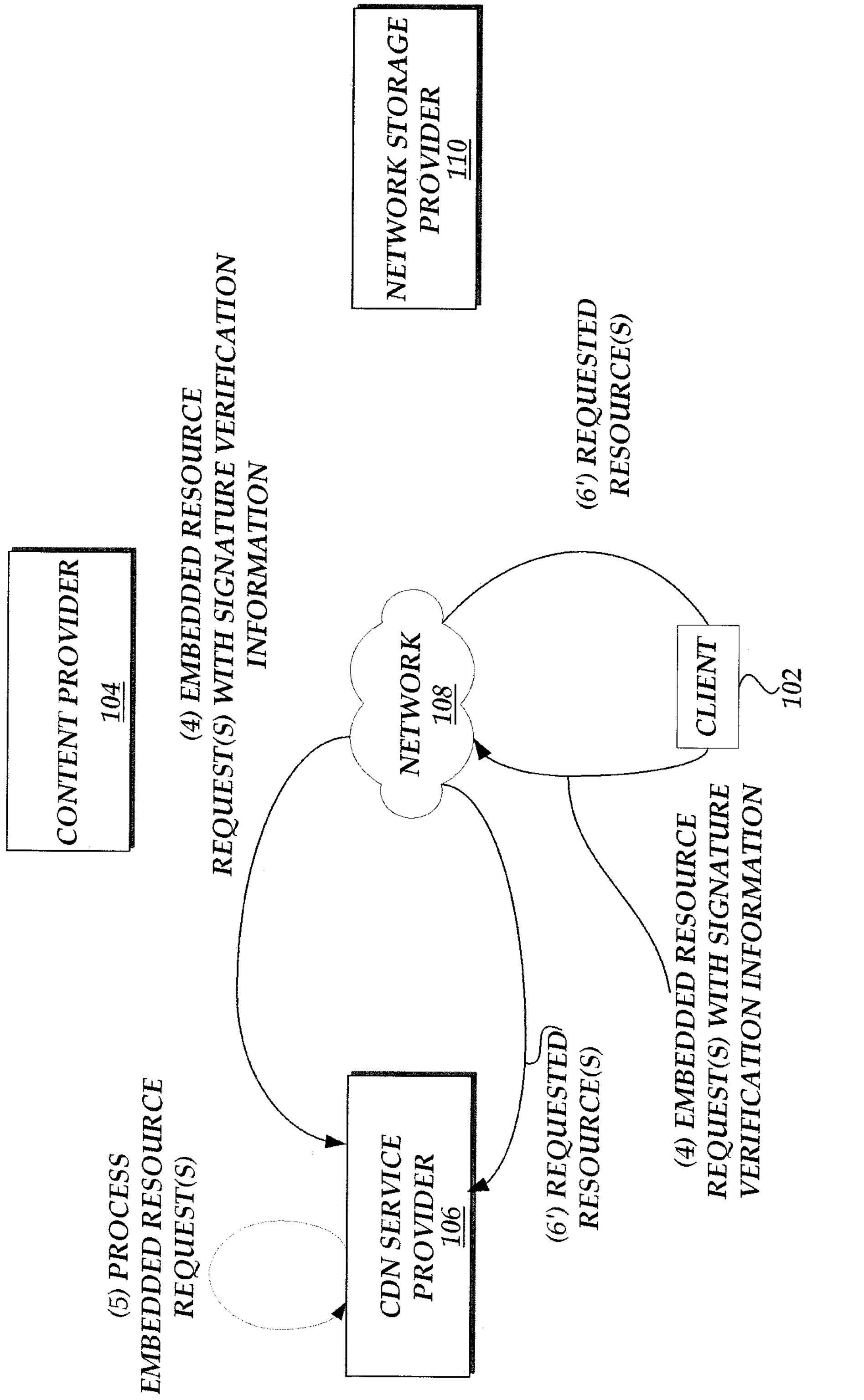

With reference now to FIG. 4B, upon receipt of the successful resolution of the DNS query to the CDN service provider storage component (e.g., a DNS query corresponding to the modified URL http://additional information.CDNprovider.com/path/resource.xxx), the client computing device 102 transmits embedded resource requests to the CDN service provider storage component 124, 130, 136 (FIG. 1) corresponding to the previously provided IP address, illustrated generally as being received by the CDN service provider 106.

Upon receipt, the receiving CDN service provider storage component can process the resource request from the client computing device 102. In a first aspect, if the requested content corresponds to secure content (as designated by the content provider 104), the CDN service provider storage component can first verify whether the embedded resource request from the client computing device 102 includes appropriate signature information. As discussed with regard to FIG. 2A, the content provider 104 can provide the CDN service provider 106 with the necessary signature information for processing client computing device resource requests. Alternatively, the content provider 104 and CDN service provider 106 can be configured to utilized one or more additional network based services, such as secure information verification services 156, to verify signature information included in any embedded resource requests. If the embedded resource request does not include the necessary signature information or if submitted signature information is not valid or expired, the CDN service provider 106 can return an error message or otherwise reject the resource request from the client computing device.

Alternatively, as illustrated in FIG. 4B, if the CDN service provider 106 determines that the submitted signature information is valid and appropriate, the CDN service provider attempts to process the resource requests from resources maintained by the CDN service provider 106 (at one or more POPs 120, 126, 132 (FIG. 1)). If the requested resource is available, the CDN service provider 106 provides the requested resource to the client computing device 102. For example, the requested resource can be transmitted to the requesting client computing device 102 via the communication network 108.

Figure 4C:
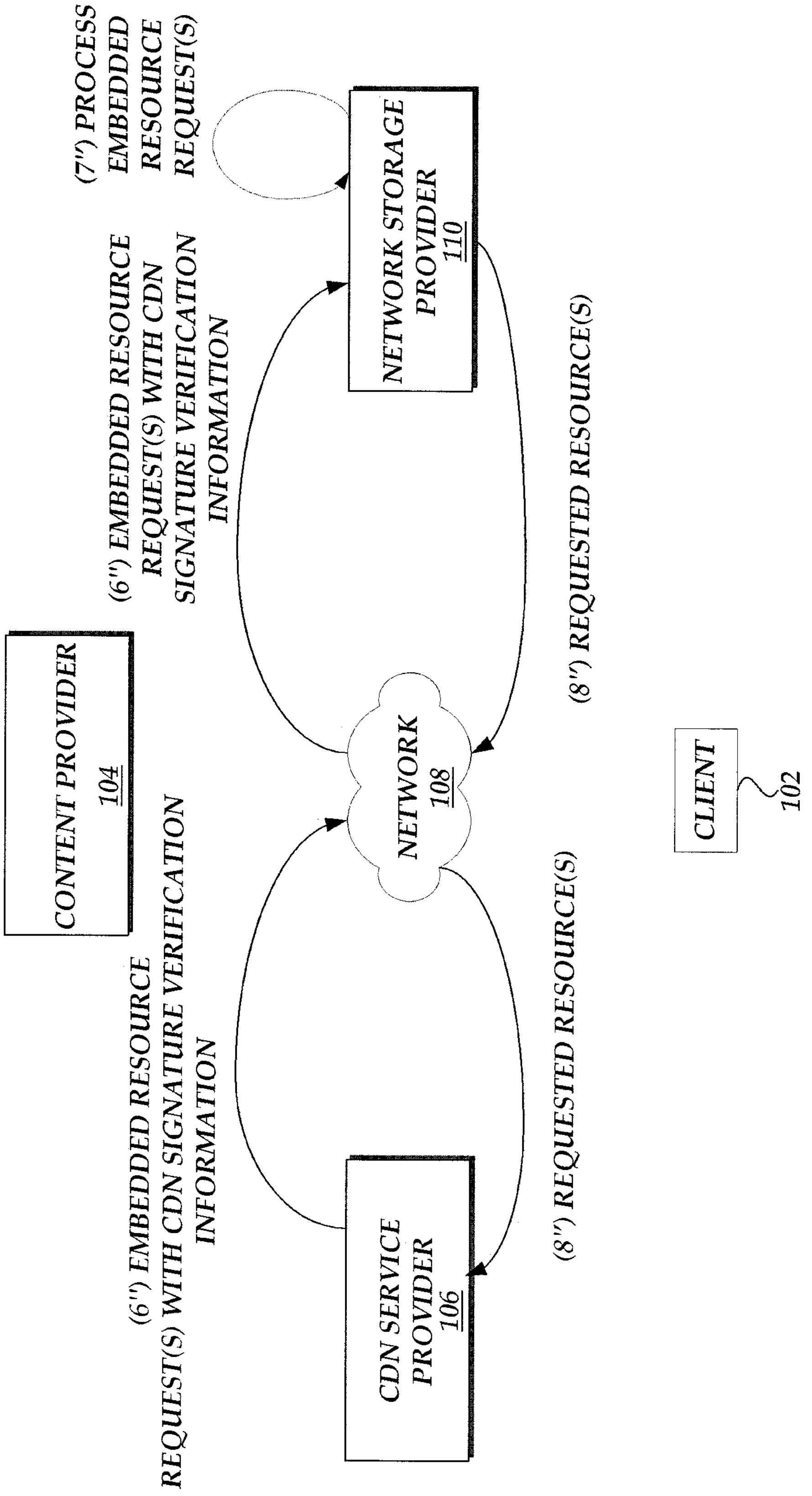

With reference now to FIG. 4C, in an alternative embodiment, assume that the CDN service provider 106 determines that the submitted signature information is valid and appropriate, but the requested resource is not available at the CDN service provider POPs. For example, the client computing device request for the resource may be the first request for such a resource. In another example, the version of the resource maintained by the CDN service provider 106 may no longer be valid (e.g., based on expiration data associated, or otherwise maintained, by the CDN service provider). Because the requested resource is not available, the CDN service provider 106 requests the resource from a designated origin source, such as the network storage provider 110. In an illustrative embodiment, the CDN service provider's resource request includes an identity provided by the content provider 104. Additionally, in an illustrative embodiment, the CDN service provider's resource request includes signature information utilized by the network storage provider 110. Illustratively, the signature information can be different from the signature information provided by the client computing device 102 (FIG. 4B). If the signature information is not valid or incomplete, the network storage service provider 110 can reject the resource request.

Based on the submitted identifier and signature information, the network storage service provider 110 processes the resource requests in accordance with the policies previously set by the content provider 104. For example, the network storage service provider 110 may maintain access control lists ("ACL") based on identities. The ACLs can define which identities can access a requested resource, criteria associated with authorized access (e.g., time restraints for accessing resources) and various policies that are to be associated with returned resources (e.g., expiration data for the requested resource). One skilled in the relevant art will appreciate that additional or alternative policy information may be utilized by the content provider 104 or network storage provider 110. Still further, in an illustrative embodiment, the content provider 104 may authorize, or otherwise designate as proxies, entities to define, modify or maintain policy information. For example, a network storage provider 110 may be authorized by a content provider 104 to modify any policy information associated with one or more CDN service providers 106.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, “can,” “could,” “might,” or “may,” unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction “or” in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:

receiving, from a first storage device at a second storage device, a first storage device request for a resource, the first storage device request initiated by the first storage device responsive to the first storage device receiving a client request for the resource from a client computing device and processing first signature information included in the client request for the resource to authorize the client request, the first storage device request including second signature information, the second signature information being different from the first signature information; and providing, from the second storage device, the resource to the first storage device based at least in part on processing the second signature information to authorize the first storage device request.

2. The computer-implemented method as recited in claim 1, wherein the second signature information is originally provided by a network storage computing device.

3. The computer-implemented method as recited in claim 2, wherein the second storage device is a network storage computing device.

4. The computer-implemented method as recited in claim 3, wherein the network storage computing device provides the resource further in accordance with policies associated with a uniform resource locator (URL) corresponding to the client request.

5. The computer-implemented method as recited in claim 4, wherein the policies associated with the URL correspond to an access control list associated with the URL.

6. The computer-implemented method as recited in claim 5, wherein the access control list identifies one or more entities that may access the resource.

7. The computer-implemented method as recited in claim 5, wherein the access control list defines one or more parameters associated with the resource.

8. The computer-implemented method as recited in claim 7, wherein the one or more parameters include expiration data associated with the resource.

9. The computer-implemented method as recited in claim 1, wherein the client request comprises a domain name system (DNS) query associated with the resource.

10. The computer-implemented method as recited in claim 1, wherein the second signature information is originally provided by the second storage device for use in the first storage device request.

11. A system comprising:

a second storage device including a hardware processor and a memory, the second storage device configured to:

receive, from a first storage device, a first storage device request for a resource, the first storage device request initiated by the first storage device responsive to the first storage device receiving a client request for the resource from a client computing device and processing first signature information included in the client request for the resource to authorize the client request, the first storage device request including second signature information, the second signature information being different from the first signature information; and provide the resource to the first storage device based at least in part on processing the second signature information to authorize the first storage device request.

12. The system as recited in claim 11, wherein the first storage device is provided by a content delivery network (CDN) provider.

13. The system as recited in claim 12, wherein the second storage device is provided by a network storage provider.

14. The system as recited in claim 13, wherein the resource is originally provided by an original content provider.

15. The system as recited in claim 12 further comprising the first storage device.

16. The system as recited in claim 11, wherein the second storage device is a network storage computing device.

17. The system as recited in claim 16, wherein the second storage device provides the resource further in accordance with policies associated with a uniform resource locator (URL) corresponding to the client request.

18. The system as recited in claim 17, wherein the policies associated with the URL correspond to an access control list associated with the URL.

19. The system as recited in claim 18, wherein the access control list identifies one or more entities that may access the resource.

20. The system as recited in claim 19, wherein the access control list defines one or more parameters associated with access to the resource by the one or more identified entities.

* * * * *